US011911992B2

(12) United States Patent
Widner et al.

(10) Patent No.: US 11,911,992 B2
(45) Date of Patent: Feb. 27, 2024

(54) CONTROLS FOR PAPER, SHEET, AND BOX MANUFACTURING SYSTEMS

(71) Applicant: Georgia-Pacific Corrugated LLC, Atlanta, GA (US)

(72) Inventors: Ernest Barfield Widner, Flowery Branch, GA (US); Amith Subhash Chandra Jain, Roswell, GA (US); Robert Dennis Seay, San Diego, CA (US)

(73) Assignee: Georgia-Pacific Corrugated LLC, Atlanta, GA (US)

( * ) Notice: Subject to any disclaimer, the term of this patent is extended or adjusted under 35 U.S.C. 154(b) by 0 days.

(21) Appl. No.: 17/884,022

(22) Filed: Aug. 9, 2022

(65) Prior Publication Data

US 2022/0380159 A1 Dec. 1, 2022

Related U.S. Application Data

(63) Continuation of application No. 16/033,309, filed on Jul. 12, 2018, now Pat. No. 11,485,101.
(Continued)

(51) Int. Cl.
*B31B 50/00* (2017.01)
*B26D 5/34* (2006.01)
(Continued)

(52) U.S. Cl.
CPC .............. *B31B 50/006* (2017.08); *B26D 5/34* (2013.01); *B31B 50/16* (2017.08); *B31B 50/74* (2017.08);
(Continued)

(58) Field of Classification Search
CPC ....... B31B 50/006; B31B 50/16; B31B 50/74; B26D 5/34; B31F 1/20; B31F 1/24;
(Continued)

(56) References Cited

U.S. PATENT DOCUMENTS 2,318,937 A 5/1943 Goldney et al.
3,058,869 A 10/1962 Cohen
(Continued)

FOREIGN PATENT DOCUMENTS

CA 1215568 A 12/1986
CA 2152003 A1 12/1995
(Continued)

OTHER PUBLICATIONS

BHS Corrugator 4.0 Presentation (ICCA, Apr. 2015) 13 pages.
(Continued)

*Primary Examiner* — Sameh Tawfik

(57) ABSTRACT

Systems for providing efficient manufacturing of sheet or box structures, corrugate sheets, or other products of varying size and structure often with pre-applied print ("pre-print") are provided herein. The systems include various features and modules that enable automated control of the corrugator, including the knives, slitters, scorers and cut-to-mark detection system(s), are contemplated. Colored markings may be used to indicate an order change section between two order sections of a roll plan for the manufacturing process. The colored markings are detected as the corrugator runs and, once detected, a controller determines a next set of order instructions—e.g., to match the upcoming order. Thus, an order change may occur, thereby enabling automated control of the corrugator based on the new order instructions. Computer readable markings may enable checking of the actual position in the roll plan to an intended position, enabling stopping or changing of the corrugator operation if needed.

16 Claims, 21 Drawing Sheets

Related U.S. Application Data

(60) Provisional application No. 62/597,005, filed on Dec. 11, 2017, provisional application No. 62/583,853, filed on Nov. 9, 2017, provisional application No. 62/532,483, filed on Jul. 14, 2017.

(51) Int. Cl.

| | |
|---|---|
| ***B31B 50/16*** | (2017.01) |
| ***B31B 50/74*** | (2017.01) |
| ***B31F 1/20*** | (2006.01) |
| ***B31F 1/24*** | (2006.01) |
| ***B31F 1/28*** | (2006.01) |
| ***B65H 26/02*** | (2006.01) |
| ***B65H 35/00*** | (2006.01) |

(52) U.S. Cl.
CPC .................. *B31F 1/20* (2013.01); *B31F 1/24* (2013.01); *B31F 1/2822* (2013.01); *B31F 1/2831* (2013.01); *B65H 26/02* (2013.01); *B65H 35/008* (2013.01); *B65H 2551/00* (2013.01); *B65H 2701/1762* (2013.01)

(58) Field of Classification Search
CPC ...... B31F 1/2822; B31F 1/2831; B65H 26/02; B65H 35/008; B65H 2551/00; B65H 2701/1762
USPC ............................................................ 493/11
See application file for complete search history.

(56) References Cited

U.S. PATENT DOCUMENTS 3,667,252 A 6/1972 Nelson
3,667,353 A 6/1972 Ward, Jr. et al.
3,667,354 A 6/1972 Steinmetz
4,086,120 A 4/1978 Cosby et al.
4,287,797 A * 9/1981 Seragnoli ................. B26D 5/34 83/76
4,387,614 A 6/1983 Evans
4,415,978 A 11/1983 Craemer et al.
4,545,780 A 10/1985 Martin
4,576,663 A 3/1986 Bory
4,604,083 A 8/1986 Barny et al.
4,737,904 A 4/1988 Ominato
4,847,775 A 7/1989 Roch et al.
5,117,610 A 6/1992 Hartman et al.
5,325,306 A 6/1994 Adachi et al.
5,458,062 A 10/1995 Goldberg et al.
5,705,020 A 1/1998 Chiari
5,727,748 A 3/1998 Prittie
5,802,974 A 9/1998 McNeil
5,816,994 A 10/1998 Hill et al.
5,822,208 A 10/1998 Bory
5,899,128 A 5/1999 Smithe et al.
5,918,519 A 7/1999 Schnabel et al.
5,926,825 A 7/1999 Shirakawa
6,070,396 A 6/2000 Rinaldi et al.
6,112,658 A * 9/2000 Gunther ................. B26D 5/007 101/171
6,125,374 A 9/2000 Terry et al.
6,149,565 A 11/2000 Meyer et al.
6,170,881 B1 1/2001 Salmon et al.
6,188,490 B1 2/2001 Miyake
6,207,242 B1 3/2001 Hoffman
6,234,943 B1 5/2001 Copin
6,299,730 B1 10/2001 Broek et al.
6,352,497 B1 3/2002 Hensley et al.
6,378,862 B1 4/2002 Rebeaud
6,450,381 B1 9/2002 Ernst et al.
6,473,760 B1 10/2002 Klatt et al.
6,481,709 B2 11/2002 Gombau et al.
6,496,219 B1 12/2002 Porret et al.
6,499,397 B2 12/2002 Stern
6,606,947 B2 8/2003 Frossard et al.
6,650,433 B1 11/2003 Keane et al.
6,725,123 B1 4/2004 Denuell
6,771,384 B1 8/2004 Laverty et al.
6,791,707 B2 9/2004 Laverty et al.
6,821,038 B2 11/2004 Izawa
6,893,520 B2 5/2005 Cummings et al.
6,934,046 B1 8/2005 Nishikawa et al.
6,976,798 B2 12/2005 Keane et al.
6,992,794 B2 1/2006 Keane et al.
7,009,723 B1 3/2006 Bartholet et al.
7,073,444 B2 7/2006 Alonso et al.
7,093,540 B2 8/2006 Giancaterino et al.
7,114,444 B2 10/2006 Hutchinson et al.
7,133,149 B2 11/2006 Keane et al.
7,145,670 B2 12/2006 Keane et al.
7,154,627 B2 12/2006 Nishikawa et al.
7,182,007 B2 2/2007 Berge et al.
7,187,465 B2 3/2007 Keane et al.
7,187,472 B2 3/2007 Friedman et al.
7,187,995 B2 3/2007 Floeder et al.
7,242,463 B2 7/2007 Pilloud et al.
7,297,969 B1 11/2007 Wolinsky et al.
7,307,749 B2 12/2007 Nishikawa et al.
7,398,733 B2 7/2008 De Vries et al.
7,469,872 B2 12/2008 Compagnone et al.
7,495,796 B2 2/2009 Keane et al.
7,542,155 B2 6/2009 Paskalev et al.
7,726,899 B2 6/2010 Clement
7,832,441 B2 11/2010 Titz
7,855,799 B2 12/2010 Shah
7,871,479 B2 1/2011 Garland
7,949,566 B2 5/2011 Fogelson
8,009,308 B2 8/2011 Field
8,030,013 B2 10/2011 Llovet et al.
8,045,147 B2 10/2011 Toma et al.
8,059,290 B2 11/2011 Kuroshima
8,060,234 B2 11/2011 Hellstrom et al.
8,175,739 B2 5/2012 Floeder et al.
8,241,454 B2 8/2012 Kraus et al.
8,270,007 B2 9/2012 Pandit et al.
8,310,696 B2 11/2012 Gustafson et al.
8,390,872 B2 3/2013 Abe et al.
8,418,614 B2 4/2013 Whitelaw et al.
8,464,638 B2 6/2013 Whitelaw et al.
8,482,766 B2 7/2013 Greene et al.
8,488,144 B2 7/2013 Fujimori et al.
8,520,254 B2 8/2013 Rai
8,531,721 B2 9/2013 Minagawa
8,534,194 B2 9/2013 Whitelaw et al.
8,630,013 B2 1/2014 Minagawa
8,634,089 B2 1/2014 Keane et al.
8,634,731 B2 1/2014 Has et al.
8,732,003 B2 5/2014 Keane et al.
8,733,222 B2 5/2014 Borel et al.
8,757,479 B2 6/2014 Clark et al.
8,783,144 B2 7/2014 Compagnone et al.
8,817,324 B2 8/2014 Giannetti et al.
8,834,334 B2 9/2014 Palm et al.
8,842,313 B2 9/2014 Harrington
8,887,637 B2 11/2014 Huber et al.
8,891,126 B2 11/2014 Tufano
8,931,410 B2 1/2015 Noy
9,056,515 B2 6/2015 Wingkono et al.
9,073,720 B2 7/2015 Beguin et al.
9,108,382 B2 8/2015 Gnan et al.
9,132,599 B2 9/2015 Bober
9,152,362 B2 10/2015 Keane et al.
9,278,555 B2 3/2016 Toriihara et al.
9,298,404 B2 3/2016 Niblett, Jr.
9,298,706 B2 3/2016 Magnell
9,325,860 B2 4/2016 Lachajewski et al.
9,327,421 B2 5/2016 Beguin
9,327,485 B2 5/2016 Mann et al.
9,340,007 B2 5/2016 D'Annunzio et al.
9,361,550 B2 6/2016 Barros et al.
9,481,537 B2 11/2016 Beguin et al.
9,518,362 B2 12/2016 Bomstad et al.
9,539,828 B2 1/2017 Yasinover et al.

(56) References Cited

U.S. PATENT DOCUMENTS

| | | | |
|---|---|---|---|
| 9,645,774 | B2 | 5/2017 | Keane et al. |
| 9,663,261 | B2 | 5/2017 | Azad et al. |
| 9,898,232 | B2 | 2/2018 | Has et al. |
| 9,904,494 | B2 | 2/2018 | Ujike |
| 10,576,650 | B2 | 3/2020 | Bayer et al. |
| 2002/0014577 | A1 | 2/2002 | Ulrich et al. |
| 2002/0062751 | A1 | 5/2002 | Bardet et al. |
| 2002/0078847 | A1 | 6/2002 | Bardet et al. |
| 2002/0083857 | A1 | 7/2002 | Bardet et al. |
| 2002/0197091 | A1 | 12/2002 | Otsuki |
| 2003/0149747 | A1 | 8/2003 | Rai et al. |
| 2004/0041991 | A1 | 3/2004 | Obertegger |
| 2004/0042022 | A1 | 3/2004 | Friedman et al. |
| 2004/0150856 | A1 | 8/2004 | Asai |
| 2004/0182503 | A1 | 9/2004 | Stadele |
| 2004/0182504 | A1 | 9/2004 | Stadele et al. |
| 2004/0211330 | A1 | 10/2004 | Clark et al. |
| 2004/0211510 | A1 | 10/2004 | Franko |
| 2005/0000084 | A1 | 1/2005 | Barbet et al. |
| 2005/0000842 | A1 | 1/2005 | Timmerman et al. |
| 2005/0044550 | A1 | 2/2005 | Perdu |
| 2005/0085362 | A1 | 4/2005 | Hutchinson et al. |
| 2005/0141760 | A1 | 6/2005 | Floeder et al. |
| 2005/0209075 | A1 | 9/2005 | Kocherga et al. |
| 2005/0247173 | A1 | 11/2005 | Alsten et al. |
| 2006/0027303 | A1 | 2/2006 | Hunter |
| 2006/0090319 | A1 | 5/2006 | Howe |
| 2006/0148631 | A1 | 7/2006 | Protocsnak et al. |
| 2006/0222429 | A1 | 10/2006 | Kurashina |
| 2006/0257014 | A1 | 11/2006 | Oi |
| 2007/0120357 | A1 | 5/2007 | Kapadi et al. |
| 2007/0162326 | A1 | 7/2007 | Weel et al. |
| 2007/0175350 | A1 | 8/2007 | Crum |
| 2007/0289460 | A1 | 12/2007 | Tang |
| 2008/0075488 | A1 | 3/2008 | Moriyama et al. |
| 2008/0239381 | A1 | 10/2008 | Oshima |
| 2008/0273224 | A1 | 11/2008 | Maulsby et al. |
| 2008/0308215 | A1 | 12/2008 | Kraus et al. |
| 2008/0308251 | A1 | 12/2008 | Weyer et al. |
| 2009/0021838 | A1 | 1/2009 | Raymond et al. |
| 2009/0025002 | A1 | 1/2009 | Rai |
| 2009/0080022 | A1 | 3/2009 | Tsutsumi |
| 2009/0120563 | A1 | 5/2009 | Titz |
| 2009/0217835 | A1 | 9/2009 | Rozenblum |
| 2009/0218380 | A1 | 9/2009 | Prittie |
| 2009/0243204 | A1 | 10/2009 | Breunig et al. |
| 2009/0262159 | A1 | 10/2009 | Lang |
| 2011/0122212 | A1 | 5/2011 | Pettersson et al. |
| 2011/0149337 | A1 | 6/2011 | Goetz et al. |
| 2012/0019866 | A1 | 1/2012 | Kuroshima |
| 2012/0053039 | A1 | 3/2012 | Compagnone et al. |
| 2012/0148326 | A1 | 6/2012 | Ipponyari et al. |
| 2012/0250047 | A1 | 10/2012 | Prati |
| 2013/0029825 | A1 | 1/2013 | Rich |
| 2013/0094033 | A1 | 4/2013 | Giannetti et al. |
| 2013/0139959 | A1 | 6/2013 | Wang |
| 2013/0141763 | A1* | 6/2013 | Giannetti ............. G06K 15/021 358/1.18 |
| 2013/0184133 | A1 | 7/2013 | Sugimoto et al. |
| 2013/0184134 | A1 | 7/2013 | Suzuki et al. |
| 2013/0203579 | A1 | 8/2013 | Vermunt |
| 2013/0209750 | A1 | 8/2013 | Van Berlo |
| 2013/0286410 | A1 | 10/2013 | Yasinover et al. |
| 2014/0000785 | A1 | 1/2014 | Gnan et al. |
| 2014/0067104 | A1 | 3/2014 | Osterhout |
| 2014/0162862 | A1 | 6/2014 | Shimura et al. |
| 2014/0182470 | A1 | 7/2014 | Clarke et al. |
| 2014/0251170 | A1 | 9/2014 | Chiari et al. |
| 2014/0274643 | A1 | 9/2014 | Clark et al. |
| 2014/0293297 | A1* | 10/2014 | Nagahara ................ B41J 25/20 358/1.6 |
| 2014/0297357 | A1 | 10/2014 | Zeng et al. |
| 2014/0376043 | A1 | 12/2014 | Tsujita |
| 2015/0022845 | A1 | 1/2015 | Roscoe et al. |
| 2015/0090140 | A1 | 4/2015 | Rancourt et al. |
| 2015/0101740 | A1 | 4/2015 | Morales Garcia de la Vega et al. |
| 2015/0115976 | A1 | 4/2015 | Adams et al. |
| 2015/0221077 | A1 | 8/2015 | Kawabata et al. |
| 2015/0291382 | A1 | 10/2015 | Moh |
| 2015/0292155 | A1 | 10/2015 | Bomstad et al. |
| 2015/0292163 | A1 | 10/2015 | Bomstad et al. |
| 2016/0004249 | A1 | 1/2016 | Cummings et al. |
| 2016/0008998 | A1 | 1/2016 | Denisse et al. |
| 2016/0016324 | A1 | 1/2016 | Bapst et al. |
| 2016/0121572 | A1 | 5/2016 | Giancaterino |
| 2016/0231966 | A1 | 8/2016 | Ujike |
| 2016/0286064 | A1 | 9/2016 | Numao et al. |
| 2016/0306595 | A1 | 10/2016 | Has et al. |
| 2016/0318297 | A1 | 11/2016 | Whitelaw et al. |
| 2016/0361886 | A1 | 12/2016 | Suzuki et al. |
| 2017/0043570 | A1 | 2/2017 | Bastici et al. |
| 2017/0057771 | A1 | 3/2017 | Clement |
| 2017/0087793 | A1 | 3/2017 | Mark et al. |
| 2017/0087794 | A1 | 3/2017 | Bayer et al. |
| 2017/0087879 | A1 | 3/2017 | Mark |
| 2017/0180598 | A1 | 6/2017 | Nagahara |
| 2017/0308335 | A1 | 10/2017 | Keane et al. |
| 2017/0344316 | A1 | 11/2017 | Keane et al. |
| 2018/0000842 | A1 | 1/2018 | Dhuppad et al. |
| 2018/0009616 | A1 | 1/2018 | Kodama et al. |
| 2018/0037037 | A1 | 2/2018 | Takagi et al. |
| 2018/0200906 | A1 | 7/2018 | Senoo |
| 2018/0215061 | A1 | 8/2018 | Bayer et al. |
| 2018/0250971 | A1 | 9/2018 | Singla et al. |
| 2018/0253263 | A1 | 9/2018 | Hower et al. |
| 2018/0345619 | A1* | 12/2018 | Lang ..................... B31F 1/2813 |
| 2019/0016081 | A1 | 1/2019 | Widner et al. |
| 2019/0016551 | A1 | 1/2019 | Seay |
| 2019/0018628 | A1 | 1/2019 | Sloan, IV et al. |
| 2019/0018629 | A1 | 1/2019 | Seay |
| 2019/0024315 | A1 | 1/2019 | Bomstad et al. |
| 2019/0084266 | A1 | 3/2019 | Grunwald et al. |
| 2019/0193368 | A1 | 6/2019 | Eder et al. |
| 2020/0114668 | A1 | 4/2020 | Havive et al. |
| 2020/0218479 | A1 | 7/2020 | Sloan, IV et al. |
| 2021/0311677 | A1 | 10/2021 | Sloan, IV et al. |
| 2022/0204298 | A1 | 6/2022 | Seay |

FOREIGN PATENT DOCUMENTS

| | | | |
|---|---|---|---|
| CA | 2398171 | A1 | 8/2001 |
| CA | 2999388 | A1 | 3/2017 |
| CN | 101124528 | A | 2/2008 |
| CN | 201030576 | Y | 3/2008 |
| CN | 101219723 | A | 7/2008 |
| CN | 101323184 | A | 12/2008 |
| CN | 101796396 | A | 8/2010 |
| CN | 101977777 | A | 2/2011 |
| CN | 102173162 | A | 9/2011 |
| CN | 103286812 | A | 9/2013 |
| CN | 203307684 | U | 11/2013 |
| CN | 103465509 | A | 12/2013 |
| CN | 103879026 | A | 6/2014 |
| CN | 203919153 | U | 11/2014 |
| CN | 106363962 | A | 2/2017 |
| CN | 106553388 | A | 4/2017 |
| EP | 0875482 | A1 | 11/1998 |
| EP | 0972639 | B1 | 1/2000 |
| EP | 1132203 | B1 | 9/2001 |
| EP | 0983853 | B1 | 5/2003 |
| EP | 1459878 | A2 | 9/2004 |
| EP | 1593502 | B1 | 11/2005 |
| EP | 1655116 | A1 | 5/2006 |
| EP | 1916102 | B1 | 4/2008 |
| EP | 1956456 | A1 | 8/2008 |
| EP | 2100732 | A1 | 9/2009 |
| EP | 1459878 | B1 | 7/2010 |
| EP | 2227396 | B1 | 9/2010 |
| EP | 2250019 | B1 | 11/2010 |
| EP | 2298552 | B1 | 3/2011 |
| EP | 2429781 | B1 | 3/2012 |
| EP | 2429782 | B1 | 3/2012 |
| EP | 2551117 | A2 | 1/2013 |
| EP | 2611614 | B1 | 7/2013 |

(56) References Cited

FOREIGN PATENT DOCUMENTS

| | | | |
|---|---|---|---|
| EP | 1243414 | B2 | 12/2014 |
| EP | 2928651 | A1 | 10/2015 |
| EP | 2964436 | B1 | 1/2016 |
| EP | 3010717 | B1 | 4/2016 |
| EP | 2428360 | B1 | 3/2017 |
| EP | 3652687 | A1 | 5/2020 |
| GB | 2102769 | A | 2/1983 |
| GB | 2542569 | A | 3/2017 |
| GB | 2542645 | A | 3/2017 |
| JP | S62-290527 | A | 12/1987 |
| JP | H07137720 | A | 5/1995 |
| JP | H11165814 | A | 6/1999 |
| JP | 2000118797 | A | 4/2000 |
| JP | 2000153802 | A | 6/2000 |
| JP | 2002113971 | A | 4/2002 |
| JP | 2002/233990 | A | 8/2002 |
| JP | 2002-273800 | A | 9/2002 |
| JP | 2002304426 | A | 10/2002 |
| JP | 2003-245894 | A | 9/2003 |
| JP | 2004-82279 | A | 3/2004 |
| JP | 2007-245257 | A | 9/2007 |
| JP | 2009154229 | A | 7/2009 |
| JP | 2010158902 | A | 7/2010 |
| JP | 4718981 | B2 | 7/2011 |
| JP | 2012139952 | A | 7/2012 |
| JP | 2015157375 | A | 9/2015 |
| JP | 2015217535 | A | 12/2015 |
| JP | 2016154008 | A | 8/2016 |
| JP | 2017-035755 | A | 2/2017 |
| KR | 2010-0138218 | A | 12/2010 |
| KR | 101102628 | B1 | 1/2012 |
| KR | 101518219 | B1 | 5/2015 |
| TW | M271837 | U | 8/2005 |
| WO | 2009/014818 | A1 | 1/2009 |
| WO | 20121065689 | A1 | 5/2012 |
| WO | 2014/023487 | A1 | 2/2014 |
| WO | 2014/206496 | A1 | 12/2014 |
| WO | 2016/087053 | A1 | 6/2016 |
| WO | 2016/165774 | A1 | 10/2016 |
| WO | 2017/026135 | A1 | 2/2017 |
| WO | 2017/051146 | A1 | 3/2017 |
| WO | 2017/131720 | A1 | 8/2017 |
| WO | 2017/178228 | A1 | 10/2017 |

OTHER PUBLICATIONS

Chang et al., Proceedings of the 2003 Winter Simulation Conference, "Simulation-Based Scheduling Dynamic Discrete Manufacturing", retrieved from <https://www.researchgate.net/profile/Chin_Chong/publication/4053706_Dynamic_scheduling_I_simulation-based_scheduling_for_dynamic_discrete_manufacturing/links/0deec52a5c1c8a0a56000000/Dynamic-scheduling-I-simulation-based-scheduling-for-dynamic-discrete-manufacturing.pdf> 10 pages.

Lehtonen et al., Proceedings of the 2003 Winter Simulation Conference, "Simulation-Based Finite Scheduling at Albany International", retrieved from <https://pdfs.semanticscholar.org/71ab/4037976abb74e3874a158892e24254044970.pdf> 7 pages.

HP Development Company; "Reinventing End-to-end Solutions with HP and Our Partners", Product Brochure, Published 2016.

International Search Report and Written Opinion, PCT/US2018/042000, dated Nov. 7, 2018, 10 pages.

Invitation to Pay Additional Fees and, Where Applicable, Protest Fee, PCT/US2018/041992, dated Nov. 28, 2018, 15 pages.

International Search Report and Written Opinion, PCT/US2018/041990, dated Nov. 7, 2018, 13 pages.

International Search Report and Written Opinion, PCT/US2018/041988, dated Nov. 7, 2018, 12 pages.

International Search Report and Written Opinion, PCT/US2018/041992, dated Jan. 21, 2019, 20 pages.

Office Action received for CN Application No. 201880037361.X. dated Feb. 26, 2021, 33 Pages. (19 Pages of English Translation and 14 pages of Official Notification).

Notification of Reasons for Refusal received for JP application No. 2020-500729, dated Jun. 7, 2022, 8 pages (4 pages of english translation and 4 pages of official copy).

Notification of Reasons for Refusal received for JP application No. 2020-500840, dated Jun. 14, 2022, 12 pages (6 pages of english translation and 6 pages of official copy).

* cited by examiner

CONTROLS FOR PAPER, SHEET, AND BOX MANUFACTURING SYSTEMS

CROSS REFERENCE TO RELATED APPLICATIONS

This application claims priority to and is a continuation of U.S. patent application Ser. No. 16/033,309, entitled "Controls for Paper, Sheet, and Box Manufacturing Systems", filed Jul. 12, 2018, which claims priority to U.S. Provisional Patent Application No. 62/597,005, entitled "Controls for Paper, Sheet, and Box Manufacturing Systems", filed Dec. 11, 2017; U.S. Provisional Patent Application No. 62/583,853, entitled "Controls for Paper, Sheet, and Box Manufacturing Systems", filed Nov. 9, 2017; and U.S. Provisional Patent Application No. 62/532,483, entitled "Digital Pre-Print Paper, Sheet, and Box Manufacturing Systems", filed Jul. 14, 2017, each of which is hereby incorporated by reference in its entirety.

FIELD OF THE INVENTION

Example embodiments of the present invention generally relate to paper, sheet and box manufacturing systems and, more particularly to, pre-print paper, sheet and box manufacturing systems.

BACKGROUND

Corrugated sheet and box manufacturing includes, in some cases, using a corrugator to glue together layers of board web with a flute medium positioned in between. Depending on the desired characteristics of the corrugated board web, different layers/arrangements can be combined. Once formed, the corrugated board web (e.g., top layer, flute medium, and bottom layer) may then be cut into appropriate sheet or box structures, and later scored, cut, glued etc. to form the knocked down box (that is then folded and manipulated to form the box, such as by the customer).

Depending on the desired sheet or box for the customer, one or more printers may be used to print images (e.g., symbols, marketing indicia, product information, etc.) thereon. Such printing may occur after formation of the layered corrugate (called "post-print") or prior to formation of the layered corrugate, such as on the top layer (called "pre-print").

BRIEF SUMMARY

Embodiments of the present invention provide systems for providing efficient manufacturing of sheet or box structures for corrugate. However, some embodiments of the present invention are contemplated for extension into other product manufacturing, including other paper based product manufacturing, such as folded carton, beverage, labels, flexible paper, industrial bags, plates, cups, décor, and many others.

Using digital print processes, enhanced image quality and variability can be achieved for images on the corrugated sheet or box (or other products). In particular, the digital printing may occur prior to formation of the layered corrugate ("pre-print") to avoid printing difficulties and reliability for printing on the multi-layered corrugated structure.

In order to increase efficiency of manufacturing, some embodiments of the present invention contemplate various methods for control of the corrugator, enabling avoidance of significant product waste. To explain, one difficulty of printing during the pre-print phase is that each sheet or box structure on the corrugated board web still needs to be cut. However, it is important for the cut to be accurate since the printed images are already on the corrugated board web (e.g., you don't want to cut through an image or have an off center image for the sheet or box structure). In some embodiments, one or more corrugator plans and/or associated reel maps may be used to determine where to position and/or perform cuts with various knives of the corrugator for each sheet or box structure. However, manual checking of a corrugator plan and/or associated reel map and/or adjustment of the corrugator (such as the placement of the knives, slitters, or scorers) wastes time and product (e.g., when the corrugator is still running). In this regard, the present invention contemplates using various methods to achieve simplified automated control of the corrugator.

For example, in some embodiments, one or more colored markings may be used to indicate an order change section between two order sections. The colored markings may be detected as the corrugator runs and once detected, a controller may determine a next set of order instructions—e.g., changing order instructions to match the upcoming order. In such a regard, an order change may occur, thereby enabling automated control of the corrugator based on the new order instructions in order to cut new sheet or box structures during the upcoming order section. In some embodiments, the colored markings may be in the form of a standard cut-to-mark marking, but with a distinguishable color. In such a regard, the colored cut-to-mark marking may enable both detection of the order change section and cause initiation of one or more cuts to the corrugated board web. Another benefit of the proposed colored markings is the simplicity of the solution to enable a "blind" order change without requiring checking of the corrugator plan. This enables quick, easy and automated changing of the order instructions without utilizing computer "readable" markings.

In an example embodiment, a system for making corrugated box structures using a corrugator is provided. The system comprises a corrugated board web comprising at least a first order section and a second order section. The first order section includes at least one standard cut-to-mark marking that is used to signal an initiation of a cut of the corrugated board web to help form at least one first box structure. The second order section includes at least one standard cut-to-mark marking that is used to signal an initiation of a cut of the corrugated board web to help form at least one second box structure. The first order section is different than the second order section. The corrugated board web further comprises an order change section positioned between the first order section and the second order section. The order change section includes at least one colored cut-to-mark marking that is used to signal an initiation of a cut of the corrugated board web. The at least one colored cut-to-mark marking defines a color that is different than the standard cut-to-mark markings. The system further includes a cutting arrangement comprising at least one knife, wherein the knife is configured to cut the corrugated board web. The system further includes at least one detector that is configured to detect a color of one or more cut-to-mark markings on the corrugated board web. The at least one detector is positioned upstream of the at least one knife. The system further includes a controller configured to operate one or more components of the corrugator according to a first set of order instructions corresponding to the first order section, wherein the first set of order instructions are obtained from a corrugator plan. The controller is further configured to determine, based on data received from the at least one detector, the occurrence of at least one colored cut-to-mark marking. The occurrence of at least one colored cut-to-mark marking is determined by the at least one detector detecting the at least one colored cut-to-mark marking of the order change section. The order change section of the corrugated board web followed the first order section of the corrugated board web as the corrugated board web passes through the corrugator. The controller is further configured to determine, in response to determining the occurrence of the colored cut-to-mark marking, a next set of order instructions for a next order in the corrugator plan. The next set of order instructions is a second set of order instructions corresponding to instructions for operating one or more components of the corrugator for the second order section. The controller is further configured to determine, based on the second set of order instructions, one or more instructions for operating the at least one knife. The controller is further configured to cause operation of the at least one knife according to the one or morn instructions.

In some embodiments, the at least one knife is a slitter and the controller is further configured to determine, based on the second set of order instructions, a cross-direction position along the corrugated board web for the slitter to initiate a cut. The controller is further configured to cause the slitter to initiate the cut of the corrugated board web at the cross-direction position to separate the corrugated board web into two or more web structure lanes.

In some embodiments, the controller is further configured to determine, based on the second set of order instructions, a distance between cuts for the knife for one or more sheet structures in the second order section. The controller is further configured to cause the knife to initiate the cuts of the corrugated hoard web based on the distance.

In some embodiments, the cutting arrangement comprises a slitter and a scorer and the controller is further configured to determine, based on the second set of order instructions, one or more positions to apply one of the slitter or scorer to the corrugated board web and cause the slitter or scorer to be applied at the one or more positions on the corrugated board web.

In some embodiments, the order change section comprises an order change line.

In some embodiments, the order change section comprises a shear waste section. Additionally, in some embodiments, system further comprises at least one shearing knife and the controller is further configured to cause the at least one shearing knife to initiate a cut of the corrugated hoard web along a width of the corrugated board web in the cross-direction upon detection of the colored cut-to-mark marking to separate the shear waste section from an adjacent order section of the corrugated board web. The cut is initiated at a position along the corrugated board web corresponding to the position of the colored cut-to-mark marking such that the colored cut-to-mark marking triggers initiation of both a change in order instructions and a cut to separate the shear waste section from an adjacent order section of the corrugated board web.

In some embodiments, the controller is configured to determine the occurrence of the at least one colored cut-to-mark marking in an instance in which a color value of the color of the cut-to-mark marking detected by the at least one detector is within a predetermined color value range. The predetermined color value range corresponds to a predetermined color for the at least one colored cut-to-mark marking of the shear waste section.

In some embodiments, the controller is configured to determine the occurrence of the at least one colored cut-to-mark marking by determining the occurrence of a predetermined number of colored cut-to-mark markings.

In some embodiments, the controller is configured to determine the occurrence of the at least one colored cut-to-mark marking by determining the occurrence of at least two colored cut-to-mark markings, wherein each set of adjacent colored cut-to-mark markings are separated by at least a predetermined distance.

In some embodiments, the controller is configured to determine, in response to determining the occurrence of the colored cut-to-mark marking, the next set of order instructions for the next order in the corrugator plan without confirming the position of the corrugated board web with respect to the corrugator plan.

In another example embodiment, a web of printed material used for forming corrugated board web is provided. The web comprises a first order section that includes at least one cut-to-mark marking that is used to signal an initiation of a cut of the web to help form at least one first box structure. The web further comprises a second order section that includes at least one cut-to-mark marking that is used to signal an initiation of a cut of the web to help form at least one second box structure. The first order section is different than the second order section. The web further comprises an order change section positioned between the first order section and the second order section. The web further comprises at least one colored cut-to-mark marking included within at least one of the first order section, the second order section, or the order change section. The at least one colored cut-to-mark marking, when read by a mark detector, is configured to trigger a change in order instructions for a corrugator.

Additionally or alternatively, in some embodiments, a computer-readable marking on the top layer may be "read" during the manufacturing process to enable various control abilities during the manufacturing process. For example, by "reading" the marker and querying the corrugator plan and/or associated reel map, the corrugator controller can determine the actual position of the corrugated board web in the corrugator. This can be checked against the intended (e.g., scheduled or theoretical) position of the corrugated board web in the corrugator. Such information may, in some cases, be displayed to an operator for making a determination as to whether to stop (e.g., through an emergency stop) and/or change operation of the corrugator. In some embodiments, the actual position and the theoretical position may be displayed side-by-side as a visual representation for the operator to make a comparison. In some embodiments, automated comparisons could be performed and one or more indications could be provided to the operator. Similarly, an automated stop or change in operation of the corrugator could be implemented if there is a difference between the actual position and the theoretical position. The present invention contemplates many different types of "readable" markers (e.g., QR codes, bar codes, etc.).

In an example embodiment, a system for making corrugated box structures using a corrugator is provided. The system comprises a corrugated board web comprising at least a first order section and a second order section. The first order section includes at least one cut-to-mark marking that is used to signal an initiation of a cut of the corrugated board web to help form at least one first box structure. The second order section includes at least one cut-to-mark marking that is used to signal an initiation of a cut of the corrugated hoard web to help form at least one second box structure. The first order section is different than the second order section. The corrugated board web further comprises an order change section positioned between the first order section and the second order section. At least one of the first order section, the second order section, or the order change section includes at least one readable marking. The system further includes at least one readable mark detector that is configured to read data from one or more readable markings on the corrugated board web. The system further includes a display and a controller configured to operate one or more components of the corrugator according to a set of current order instructions corresponding an order section of the corrugated board web, wherein the set of current order instructions are obtained from a corrugator plan. The controller is further configured to determine a detected current position of the corrugated board web in the corrugator based on data read by the at least one readable mark detector from the one or more readable markings on the corrugated board web. The controller is further configured to determine a theoretical current position of the corrugated board web based on at least the current set of order instructions from the corrugator plan that are being utilized in operation of the corrugator. The controller is further configured to cause display of both a representation of the detected current position of the corrugated board web and a representation of the theoretical current position of the corrugated board web to enable an operator to compare the detected current position of the corrugated board web and the theoretical current position of the corrugated board web.

In some embodiments, the controller is configured to receive user input directing the corrugator to perform an emergency stop and cause, in response to receiving the user input, the corrugator to cease operation.

In some embodiments, the controller is configured to compare the detected current position of the corrugated hoard web and the theoretical current position of the corrugated board web and provide an indication to a user in an instance in which the detected current position of the corrugated board web is different than the theoretical current position of the corrugated board web.

In some embodiments, the representation of the detected current position of the corrugated hoard web is presented in the form of a set of order instructions for one or more components of the corrugator and the representation of the theoretical current position of the corrugated hoard web is presented in the form of a set of order instructions for one or more components of the corrugator.

In some embodiments, the representation of the detected current position of the corrugated board web is presented in the form of a visualization of the corrugated board web with one or more box structure outlines and the representation of the theoretical current position of the corrugated board web is presented in the form of a visualization of the corrugated board web with one or more box structure outlines.

In addition to the above noted features, some embodiments of the present invention contemplate other features that can be used to form efficient manufacturing processes. In some embodiments, a designed platform with various modules can be formed to create an efficient process flow, such as for aggregation of orders printed onto reels and efficient tracking thereof. For example, the present invention contemplates on-the-fly arrangement and improvements of the process flow for which sheets or boxes are to be manufactured. In some cases, the manufacturing improvements could occur through a digitally printed marker that is read during sheet or box manufacturing.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1A:
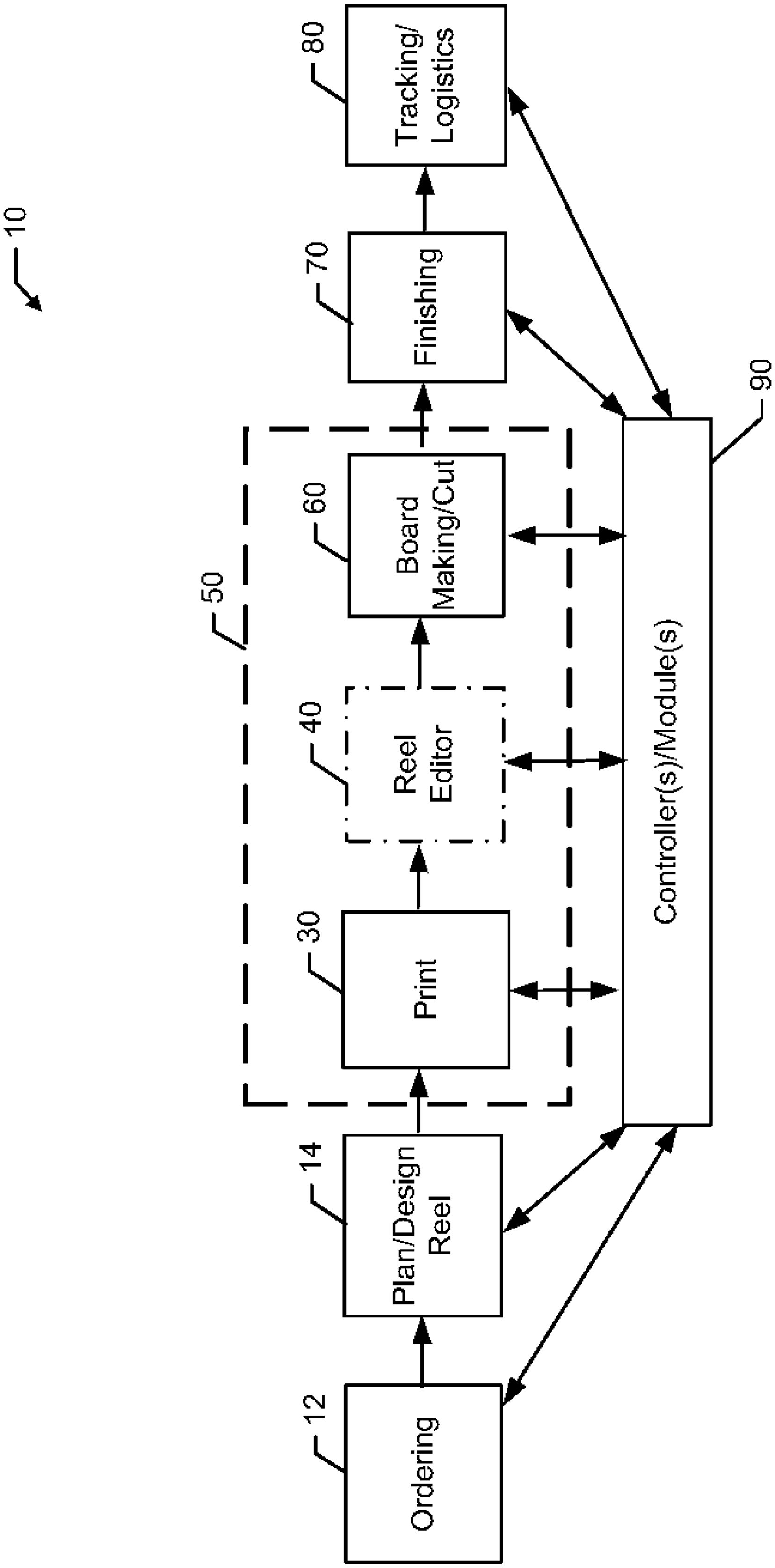
FIG. 1A shows a block diagram of an example corrugated sheet or box manufacturing process with print in-line with the corrugator, in accordance with some embodiments discussed herein.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Example Corrugated Box Manufacturing Process

Corrugated sheet and box manufacturing is an example paper, sheet, and/or box manufacturing system. In some such manufacturing, a corrugator is used to glue together layers of board web with a flute medium positioned in between. Depending on the desired characteristics of the corrugate board web, different layers/arrangements can be combined. Once formed, the corrugate board web (e.g., top layer, flute medium, and bottom layer) may then be cut into appropriate sheet or box structures, and later scored, cut, glued etc. to form the broken down box (that is then folded and manipulated to form the box, such as by the customer). Although the following description provides detailed examples of "corrugators", some example embodiments of the present invention contemplate the term "corrugator" to mean a board-making device, such as a high speed laminator.

FIG. 1A illustrates an example corrugated box manufacturing process 10 according to various embodiments of the present invention. The manufacturing process 10 includes a number of phases that result in a finished corrugated sheet or box that is shaped and printed per the customer's order. The process 10 may include an ordering phase 12, a planning phase 14, a print phase 30, a board making phase 40, a cutting phase 60, a finishing phase 70, and a tracking/logistics phase 80. In some embodiments, less or more phases or different orders of phases are contemplated. Additionally, while the described example is detailed for corrugated box making, some embodiments of the present invention are contemplated for extension into other product manufacturing, including printed paper-based product manufacturing, such as folded carton, beverage labels, flexible paper, industrial bags, plates, cups, décor, and many others.

In the ordering phase 12, a customer may supply an order that includes desired characteristics for the end product. For example, the customer may provide a number of desired sheet or box structures, sheet or box shape requirements, one or more images/designs for printing on the sheet or box, color specifications, among many others. In some embodiments, the customer 12 may input such an order through a web interface. The web interface may enable the customer 12 to easily input the desired characteristics of the order electronically. The web interface may also enable the customer to perform many related tasks, including, for example, updating orders, tracking orders, handling payment, requesting assistance, setting up automated ordering (e.g., recurring ordering), viewing and approving example images ("soft proofing"), viewing example end products, etc.

In addition to providing increased efficiency of process for the customer, the web interface may also directly interact with and provide information for automated processes useful in the remainder of the manufacturing process 10. For example, the information from the web interface may be fed directly into a corrugator plan controller (such as the controller 90) and utilized accordingly. For example, as described herein, the information from the web interface may be used to form a corrugator plan and/or associated reel map or print plan of the corrugated sheet or box structure making process. Additionally, however, the information from the web interface may be used to provide on-the-fly updates or adjustments to the manufacturing process. Further, feedback (e.g., from the controller 90) may be provided back to the web interface for the customer, such as tracking information, images of the completed sheet or box structures, among other things.

Figure 4A:
FIG. 4A illustrates an example roll (e.g., reel) with a unique roll readable marker that can be machine read to upload a reel map and/or corrugator plan associated with the roll, in accordance with some example embodiments discussed herein.

In some embodiments, a corrugator plan controller may be configured to perform various functionality useful in the manufacturing process 10 (e.g., the various modules/phases described herein). For example, the corrugator plan controller (such as during the planning phase 14) may be configured to form or determine a corrugator plan (which may include an associated reel map), such as may be used in conjunction with the corrugator 50 (e.g., during the board making phase 40 and/or cutting phase 60). In some embodiments, such as with respect to illustrated in FIG. 4A, a corrugator plan and/or reel map may be determined by detection or reading of a readable marker 98 printed or placed on the roll 11.

As used herein, in some embodiments, an associated reel map may be an example of a corrugator plan. In this regard, other example corrugator plans (e.g., a print plan) can be used, formed, etc. Further, in some embodiments, a corrugator plan may be an example or a portion of a reel map. Additionally or alternatively, the corrugator plan controller may be configured to form a print plan that is used in the printing phase 30 (such as described herein). Likewise, the corrugator plan controller may be used with the ordering phase 12, such as to receive order information, the finishing phase 70, and/or the tracking/logistics phase 80. An example corrugator plan controller is described herein as controller 90 (which is shown and described with respect to FIGS. 2A and 2B). In some embodiments, the corrugator plan controller (e.g., controller 90) may be spread over any number of controllers at any of the various phases of the manufacturing process 10. In this regard, in some embodiments, the term "corrugator plan controller" may be used as an overarching controller for controlling any processes/functionality used during the manufacturing process 10.

In some embodiments, a corrugator plan and/or associated reel map may provide a layout of the order and arrangement of the sheet or box structures that are to be printed on, formed, and cut during the manufacturing process. For example, a reel map for the section of layered corrugated board web 20 shown in FIG. 4B may include indications that there should be 4 box types (A, B, C, and D) that are arranged as shown.

Figure 4B:
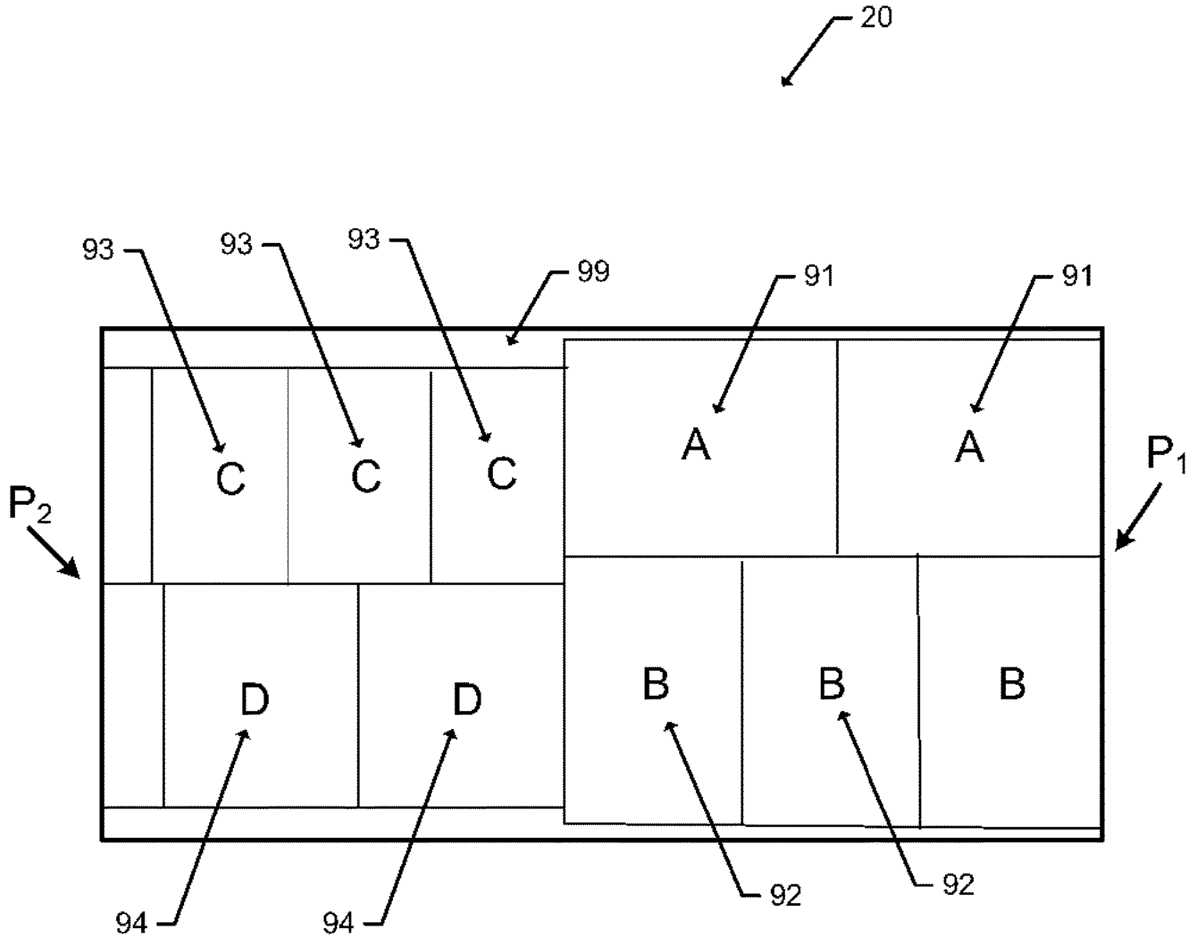
FIG. 4B shows an example portion of a layered corrugated board web with four different sheet or box structure areas, in accordance with some example embodiments discussed herein.

In some embodiments, a corrugator plan and/or associated reel map may be an electronic-based map that is referenceable for determining how the corrugator should operate. In some embodiments, the reel map may be representable in a visual form that shows a layout of the board web (such as shown in FIG. 4B), such as to a person (or persons), which may be useful for manually checking the reel map for accuracy, efficiency, and/or operating the corrugator. In some embodiments, electronic verification of such checking could occur either with or without the visual representation of the reel map.

In the past, pre-print orders and the corrugator plan and/or associated reel maps for pre-print were created far in advance of the manufacturing process with fixed graphics and structures across and down the web. To explain, limited flexibility existed in order minimum run length, graphic and structure variability, and ability to change parameters later on. With digital print processes, orders, graphics and structures can easily vary even within a reel, both across and down the web. In some cases, the order or sheet/box structure change may not be automatically detected and, thus, force manual detection to enable necessary corrections to the corrugator (e.g., the knives, slitters, and scorers). This can potentially lead to significant increased waste due to a large amount of empty or unused corrugated board web or "scrap" sheet or box structures being generated while the corrugator makes necessary corrections.

In some embodiments, the planning and/or updating of the process flow may be performed electronically and automatically updated. In this regard, the planning and updating of the reel may occur in real time, providing for the best chance to increase efficient operation of the corrugator, such as to avoid waste.

Additionally or alternatively, by enabling such electronic process flow updating, expedited orders may be inputted easily, enabling quicker response to customer needs. Likewise, changes in orders can be easily addressed without leading to unnecessary waste.

In some embodiments, sections of the process flow can be shifted from plant to plant or device to device due to various external circumstances. For example, repair of certain parts of the corrugator, replacing certain printer inks, etc., may cause only certain customer sheet or box structures to be able to be manufactured. In this regard, in some embodiments, certain portions of the process flow may be shifted, such as being jumped in line, moved to another facility, etc., in order to maintain efficient up time of operation of the printer(s) and corrugator(s).

The manufacturing process 10 may also including the printing phase 30, a reel editor phase 40, and a board making/cutting phase 60. In some embodiments, the printing phase 30, reel editor phase 40, and board making/cutting phase 60 may be performed using a corrugator 50 (such as shown in FIG. 1A) or other manufacturing system. Alternatively, in some embodiments the printing phase 30 and/or reel editor phase 40 may be performed separately, prior to the corrugator 50' (such as shown in the manufacturing process 10' shown in FIG. 1B). Similarly, FIG. 1A also illustrates that the real editor phase 40 may be optional within a corrugator 50 that also employs a printing phase 30. FIG. 2A illustrates an example corrugator 50 that incorporates the printing phase 30, the reel editor phase 40, and the board making/cutting phase 60. In some embodiments, the reel editor phase 40 may not be included in the example corrugator 50 of FIG. 2A. FIG. 2B illustrates an example corrugator 50' with the printing phase 30 and the reel editor phase 40 occurring separately, prior to the board making/cutting phase 60. This approach is sometimes referred to as a near-line process.

With reference to FIG. 2A, the corrugator 50 may, such as through controller 90, cause conveyance of one or more paper web, printed web, corrugated board web, and/or flute medium through the machine (and various phases), such as along the machine direction (MD) arrow. For example, one or more conveyor means (e.g., a conveyor bell) and/or motors may be used to cause a top layer 22 of paper web to pass through a printing phase 30 and, optionally, a reel editor phase 40. The top layer 22 of paper web may be held in a roll 21 (or other form), such as may be referred to herein as a roll of web product. The corrugator 50 may also control introduction of one or more flute mediums 29 and/or other layers to form the corrugated board web (such as the roll 23 of the bottom layer 24 of corrugated board web).

As described herein, in some embodiments, a corrugator plan driven process flow (e.g., reel map, control plan, etc.) may be used to help maintain efficient operation of the corrugator and avoid waste during making of the sheet or box structures. In this regard, a certain arrangement of sheet or box structures may progress through the corrugator 50. Such operation and tracking may occur, such as through use of the controller 90.

As described in more detail herein, the controller 90 provides logic and control functionality used during operation of the corrugator 50 and, in some embodiments, the entire manufacturing process 10. In some embodiments, the functionality of the controller 90 may be distributed to several controllers that each provide more limited functionality to discrete portions of the operation of manufacturing process 10.

The controller 90 may comprise one or more suitable electronic device(s)/server(s) capable of executing described functionality via hardware and/or software control. In some embodiments, the controller 90 may include one or more user interfaces (not shown), such as for displaying information and/or accepting instructions. The controller 90 can be, but is not limited to, a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a solid-state computer, a single-board computer, a buffered computer, a computer network, a desktop computer, a laptop computer, a personal digital assistant (PDA) or a hybrid of any of the foregoing.

The controller 90 may be operably coupled with one or more components of the manufacturing process 10, including for example, the roll 21 of the top layer 22 of corrugated board web, a medium holder (e.g., roll) 28 of medium 29, the roll 23 of the bottom layer 24 of corrugated board web, various components of the printing phase 30, various components of the reel editor phase 40, various components of the board making/cutting phase 60, conveyance means of the corrugator, various components of phases for the manufacturing process, and other components (such as described herein). For example, depending on the components, the controller 90 may be operably coupled such as through use of solid-core wiring, twisted pair wiring, coaxial cable, fiber optic cable, mechanical, wireless, radio, infrared, etc. In this regard, depending on the components, the operable coupling may be through one or more intermediate controllers or mechanical coupling, such as used for controlling some components (e.g., controlling operation and/or feeding of the roll 21 of the corrugated board web). In some embodiments, the controller 90 may be configured to provide one or more operating signals to these components and to receive data from these components.

As noted above, the controller 90 (e.g., the corrugator plan controller) may be split into more than one controller, such as multiple controllers that exchange information, data, instructions, etc. For example, the controller 90 may be split into a corrugator planning software controller, a corrugator machine user interface controller, a corrugator system controls, press 30 operations and graphics workflow software and/or specific functional controls (e.g., a separate vision system such as described herein).

In some embodiments, such as described in greater detail herein, the controller 90 may be operably coupled to one or more vision systems, such as for detecting markers and/or defects/errors during the manufacturing process. Depending on the feedback from the vision systems, the controller 90 may control the corrugator 50 and/or manufacturing process 10 accordingly.

The controller 90 may include one or more processors coupled to a memory device. Controller 90 may optionally be connected to one or more input/output (I/O) controllers or data interface devices (not shown). The memory may be any suitable form of memory such as an EPROM (Erasable Programmable Read Only Memory) chip, a flash memory chip, a disk drive, or the like. As such, the memory may store various data, protocols, instructions, computer program code, operational parameters, etc. In this regard, controller may include operation control methods embodied in application code. These methods are embodied in computer instructions written to be executed by one or more processors, typically in the form of software. The software can be encoded in any suitable language, including, but not limited to, machine language, assembly language, VHDL (Verilog Hardware Description Language), VHSIC HDL (Very High Speed IC Hardware Description Language), Fortran (formula translation), C, C++, Visual C++, Java, ALGOL (algorithmic language). BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software. In this regard, in some embodiments, the controller 90 may be configured to execute computer program code instructions to perform aspects of various embodiments of the present invention described herein.

Depending on the configuration of the corrugator, the printing phase 30 may occur prior to combining the layers of corrugated board web 21, 23 and flute medium 28 (e.g., "pre-print") or after combining two or more layers (e.g., "post-print"). In some embodiments, printing may occur to other layers (e.g., the bottom layer 23), such as in alternative to or in addition to the top layer 21.

Using digital print processes, enhanced image quality can be achieved for images on the corrugated board web (or other products). However, digital printing may have difficulties or less desirable quality if it occurs after formation of the layers. In this regard, printing may be difficult based on many corrugated board attributes including, but not limited to, dust, burnishing, fluting, warp, etc. In this regard, some embodiments of the present invention contemplate printing prior to formation of the layers of corrugate and/or flute medium. This enables increased print reliability and better image quality.

FIG. 4B shows an example arrangement of sheet or box structures A, B, C, and D on a layered corrugated board web 20, such as after the printing phase 30 and board making phase 40. Notably, the layered corrugated web 20 has sheet or box structures formed thereon. Prior to printing, however, the paper web is blank such that there is no information thereon. In this regard, the controller 90 operates the various components of the printing phase 30 to form printed images and/or markers on the blank paper web (e.g., the top layer 22 shown in FIG. 2A) to begin forming the sheet or box structures. In the depicted example of FIG. 4B, the portion of the corrugated board web 20 includes a number of first sheet or box structures (A, 91), a number of second sheet or box structures (B, 92), a number of third sheet or box structures (C, 93), and a number of fourth sheet or box structures (D, 94). The layered corrugated board web 20 also includes some unused (scrap) sections 99.

During the printing phase 30, the controller 90 may direct the press digital front end (DFE) and raster image processor (RIP), etc., to print one or more images at specific locations on the top layer 22 of the paper web. Depending on the configuration of the corrugator 50 and/or manufacturing process 10, the controller 90 may utilize a process flow (e.g., reel map) to determine where on the paper web to print the images and/or markers. For example, an image selected by the customer (such as a bottle), may be printed in the center (or other section) of a sheet or box structure—such as may ultimately be visible for marketing or other purposes once the box is formed. Any image (including, words, instructions, etc.) are contemplated by various embodiments of the present invention. Example markers that can be printed, include any marker that may be used by various components of the manufacturing process 10, such as for tracking, cutting, printing, etc. Further description regarding possible markers and their utilization is provided in greater detail herein. In this regard, the controller 90 may be connected to one or more vision systems (e.g., detectors) that are used to read or detect color, defects, and/or various markers for controlling and/or updating operation of the corrugator 50.

During the reel editor phase 40, the controller 90 may be configured to perform functions described herein related to editing or determining whether to edit the printed top layer of board web. Although shown in-line, in some example embodiments, the reel editor 40 may be out of line or near-line such that the roll of web product may be transferred to the reel editor 40 for processing. In some embodiments, the corrugator may have one or more functions/features that enable editing of the roll of web product (such as removing waste). In some such example embodiments, the reel editor 40 may form part of the corrugator.

During the board making phase 45, the controller 90 may be configured to cause combining of one or more layers and/or flute medium to form the corrugated board web for the boxes. For example, the controller 90 may be configured to cause fluted medium 29 to be fed into contact with one or more layers of corrugated board web, such as between a top layer 22 (such as from the roll 21) and a bottom layer 24 (such as from the roll 23). In this regard, in some embodiments, the fluted medium 29 may be fed into contact with the top layer 22 prior to the combined fluted medium 29 and top layer 22 coming into contact with the bottom layer 24. The controller 90 may cause formation of the combined layers into a layered corrugated board web 20, such as through use of glue or other adhesive.

During a corrugator editing phase 49, the controller 90 may be configured to edit the corrugated board web, such as by chopping out waste or undesirable corrugated hoard web. Such waste can be removed from the corrugator 50.

During the cutting phase 60, the controller 90 may be configured to cut out the sheet or box structures. In this regard, the controller 90 may be operably coupled to the various knives to control operation during the cutting phase 60. In some embodiments, the controller 90 may be configured to utilize the process flow (e.g., reel map) to determine how to operate the various knives (e.g., move the knives, cause a cut to occur, etc.).

Figure 3:
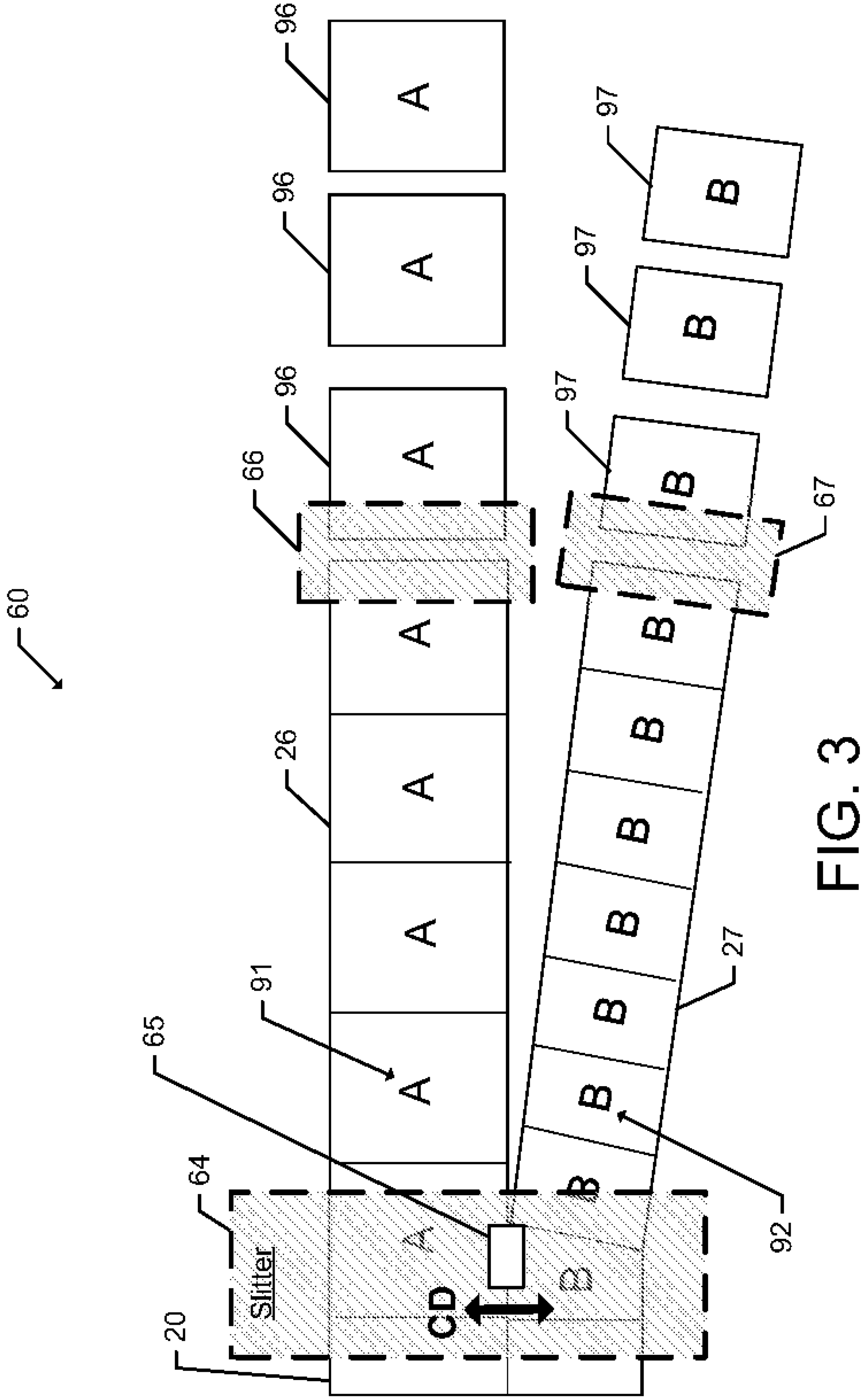
FIG. 3 illustrates a cutting arrangement portion of the corrugated box manufacturing process, in accordance with some embodiments discussed herein.

FIG. 3 shows an example cutting phase 60 that includes a knife (e.g., slitter 64) that is configured to cut the layered corrugated board web 20 in the longitudinal (or machine) direction. The cutting phase 60 also includes two knives 66, 67 that are each configured to cut the layered corrugated board web 20 in the lateral direction or cross direction CD. As described herein, the controller 90 may be operably coupled to the various knives to control operation thereof. In some embodiments, the controller 90 may be configured to utilize the process flow (e.g., reel map) to determine how to operate the various knives (e.g., move the knives, cause a cut to occur, etc.).

As the layered corrugated board web 20 passes through the cutting phase, a slitter 64 may be configured to split the layered corrugated board web 20 to cause it to split into different sections that travel on different paths (such as the top section 26 that travels along the top path and the bottom section 27 that travels along the bottom path). In some embodiments, a first sheet or box structure may form the top section 26 and a second sheet or box structure may form the bottom section 27—thereby creating two different paths that separate the two types of sheet or box structures (e.g., sheet or box structure A. 91 is formed in the top section 26 and sheet or box structure B, 92 is formed in the bottom section 27). The location 65 in which the slitter 64 performs the cut is important because sheet or box structures may vary as the layered corrugated board web 20 travels through the corrugator. For example, FIG. 4B shows that a slitter would need to cut at a first position $P_1$ to cause separation of the sheet or box structures A, 91 from the sheet or box structures B, 92. However, the slitter would need move at the right time (e.g., the transition from the sheet or box structures A, B to the sheet or box structures C, D) or a second slitter may be used to cut instead at the second position $P_2$ to cause separation of the sheet or box structures C, 93 from the sheet or box structures D, 94. Referring back to FIG. 3, the slitter 64 may be movable (such as based on instruction from the controller 90) in the cross direction CD in order to cut the layered corrugated hoard web 20 at the proper position.

Once separated into different paths, the various sections of layered corrugated board web 26, 27 may pass through respective knives 66, 67. In some embodiments, the knives 66, 67 may be configured (such as based on instruction from the controller 90) to cut the sheet or box structures in the lateral (cross) direction in order to form the desired sheet or box structures. For example, knife 66 cut the top section 26 to form the sheet or box structures A, 96. Likewise, knife 67 cut the bottom section 27 to form the sheet or box structures B, 97.

In some embodiments, other knives may be utilized for cuts, such as side slitters for cutting scrap along the edges. Likewise, other components may be utilized, such as scorers for pre-creasing sheet or box structures. Such other knives and/or components may be formed as part of the above described systems.

Referring hack to FIG. 1, with the sheet or box structures cut, the manufacturing process 10 may continue to the finishing phase 70. The finishing phase 70 may include additional printing, additional cutting, additional gluing, and/or other necessary functions to achieve a finished sheet or box structure for sending to the customer. In some embodiments, a vision system or other visual inspection system may be used to confirm accuracy of the order.

The manufacturing process 10 may also include a tracking/logistics phase 80 that includes tracking the finished sheet or box structures and preparing/delivering them to the customer. In some embodiments, one or more tracking or counting systems can be implemented upstream in the manufacturing process 10, such as to enable tracking/logistic planning (including separating orders_throughout the manufacturing process 10.

Color Markings for Detecting Order Change

In some embodiments, the present invention contemplates using one or more color markings to indicate an order change in the corrugator plan (e.g., corrugator schedule). The colored markings may be detected as the corrugator runs and, once detected, a controller may determine a next set of order instructions—e.g., changing order instructions to know how to operate the corrugator (and the various components) to produce the upcoming order. In such a regard, an order change may occur and be detected, thereby enabling automated control of the corrugator based on the new order instructions in order to cut new sheet or box structures during the upcoming order section.

In some embodiments, the colored markings ray be in the form of a standard cut-to-mark marking, but with a distinguishable color. In such a regard, the colored cut-to-mark marking may enable both detection of the order change section and cause initiation of one or more cuts to the corrugated board web. Another benefit of the proposed colored markings is the simplicity of the solution to enable a “blind” order change without requiring checking of the corrugator plan. This enables quick, easy and automated changing of the order instructions without utilizing computer “readable” markings.

Figure 5:
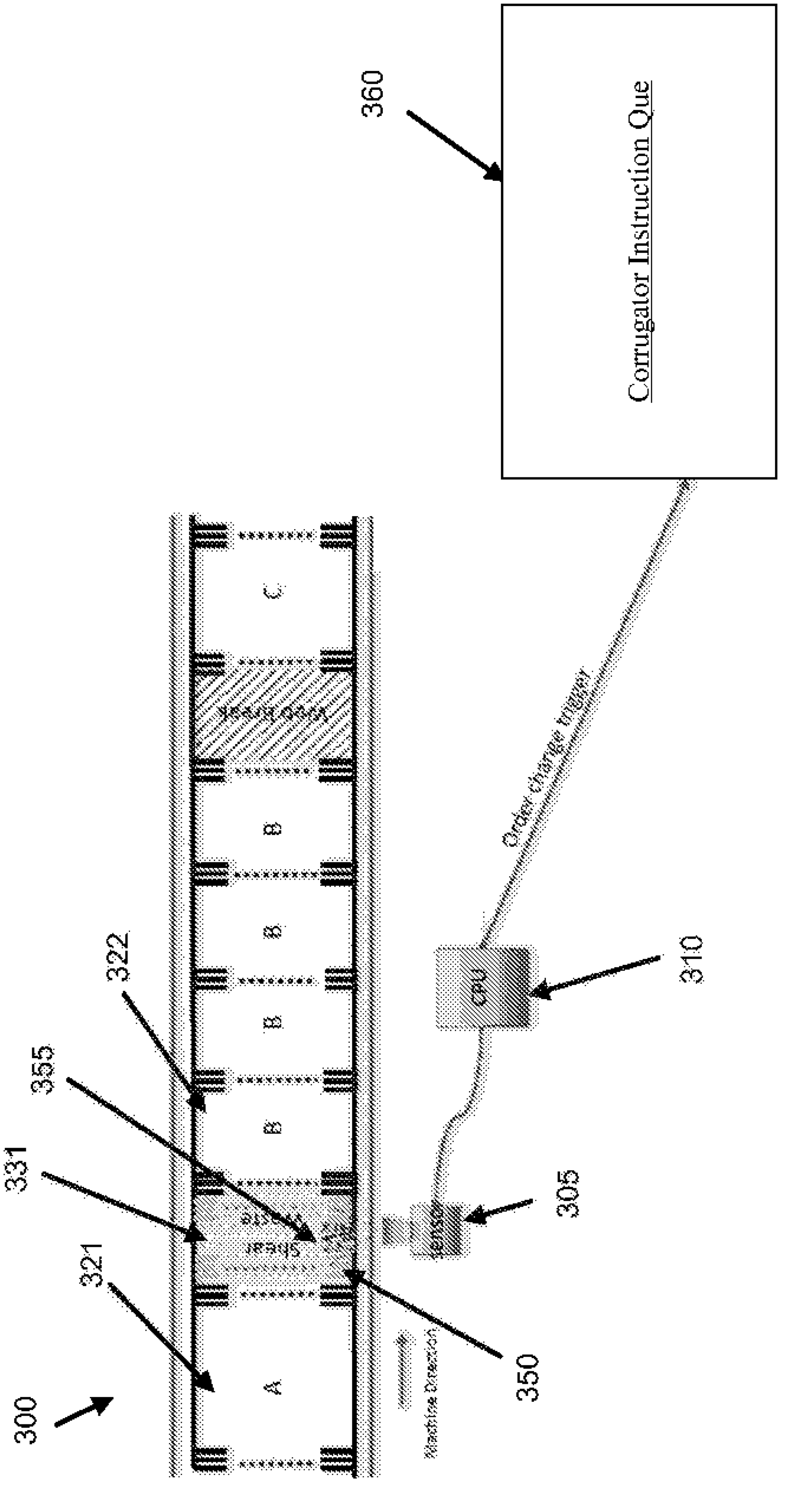
FIG. 5 illustrates an example system for detecting colored markings in an order change section and determining an order change for obtaining new order instructions for an upcoming order, in accordance with some example embodiments discussed herein.

FIG. 5 shows an example corrugator plan 300 with a web structure that includes a first order section 321, a second order section 322, and an order change (e.g., shear waste) section 331 positioned therebetween. The first order section 321 includes a box structure outline A. The second order section 322 includes a box structure outline B. Since the dimensions of box structure A and box structure B differ, there may need to be different order instructions that each enable operation of the corrugator (and its various components) to accurately cut-out the appropriate box structure outline. For example, a corrugator instruction que 360 may be utilized to hold/manage the que of completed, in process, and upcoming orders (and corresponding order instructions).

In the depicted embodiment, a controller (CPU) 310 is connected to a sensor 305. The sensor 305 is configured to detect one or more color markings. In such a regard, the order change section 331 includes color markings 350. As the web runs through the corrugator, the sensor 305 detects the color markings 350. Upon such detection, the controller 310 is configured to determine an order change (e.g., changing from order section A 321 to order section B 322). Accordingly, the controller 310 uses the corrugator plan to pull in or load up the next set of order instructions (e.g., move from orders A to orders B). In some embodiments, the switch to new orders is "blind" such that there is no "confirmation". Such an embodiment may save costs and processing power. Then, the controller 310 may begin instructing the corrugator using the new order instructions—such that the corrugator and its various components (e.g., the knives, slitters, scorers, etc.) operate to cut out the appropriate box structures (e.g., box structure outline B).

In some embodiments, such as in the depicted embodiment of FIG. 5, the color markings may be in the form of colored cut-to-mark markings. In such example embodiments, the colored cut-to-mark markings may provide the additional benefit of automatically initiating a cut (in addition to enabling detection by the sensor of an order change). In some embodiments, the colored cut-to-mark marking may be referred to as a shear-to-mark marking when used in conjunction with a shearing knife—such as to enable removal of a shear waste section (e.g., the shear waste section 331 shown in FIG. 5).

Though shown in FIG. 5, in some embodiments, no computer "readable" markings 355 may be present on the web. Alternatively, one or more computer "readable" markings may be present but no utilized for determining and obtaining an order change in the corrugator plan.

Some embodiments of the present invention contemplate many different ways to detect an order change using one or more colored markings. For example, detection of a single colored marking may indicate an order change. In some embodiments, detection of two or more colored markings may be needed to indicate an order change (e.g., at the beginning and end of the order change section). In some embodiments, there may need to be a predetermined distance between the two or more colored markings (e.g., a predetermined distance of at least 14 feet, between 13 feet and 15 feet, less than 10 feet, etc.). In some embodiments, a certain number of colored markings (e.g., 6 markings) may need to be detected to indicate an order change.

In some embodiments, the sensor may detect an intensity or color value of the colored markings and may check the detected color value against a predetermined color value threshold to determine if the detected colored marking is an intended color marking. For example, a number value may be assigned to colors on a spectrum (e.g., black has a color value of 0, cyan has a color value of 5, etc.). Upon detection of a colored marking, a color value could be determined (e.g., 4.5). That color value could be checked against a predetermined color value threshold, such as a color value range of 4-6. If the color value falls within the range, that may indicate the occurrence (or detection) of a colored marking indicative of an order change. Such example embodiments may be useful in distinguishing standard black cut-to-mark markings. Though the above example uses a range of color values, other threshold functions may be utilized by embodiments of the present invention.

In some embodiments, the number of colored markings, the color of the colored marking, and/or distances associated with multiple colored markings may indicate the exact position in the corrugator plan. For example, two consecutive markings may indicate that the corrugator plan is transitioning to the second set of order instructions. Such example embodiments may enable knowledge of the exact position of the corrugator plan.

Figure 6:
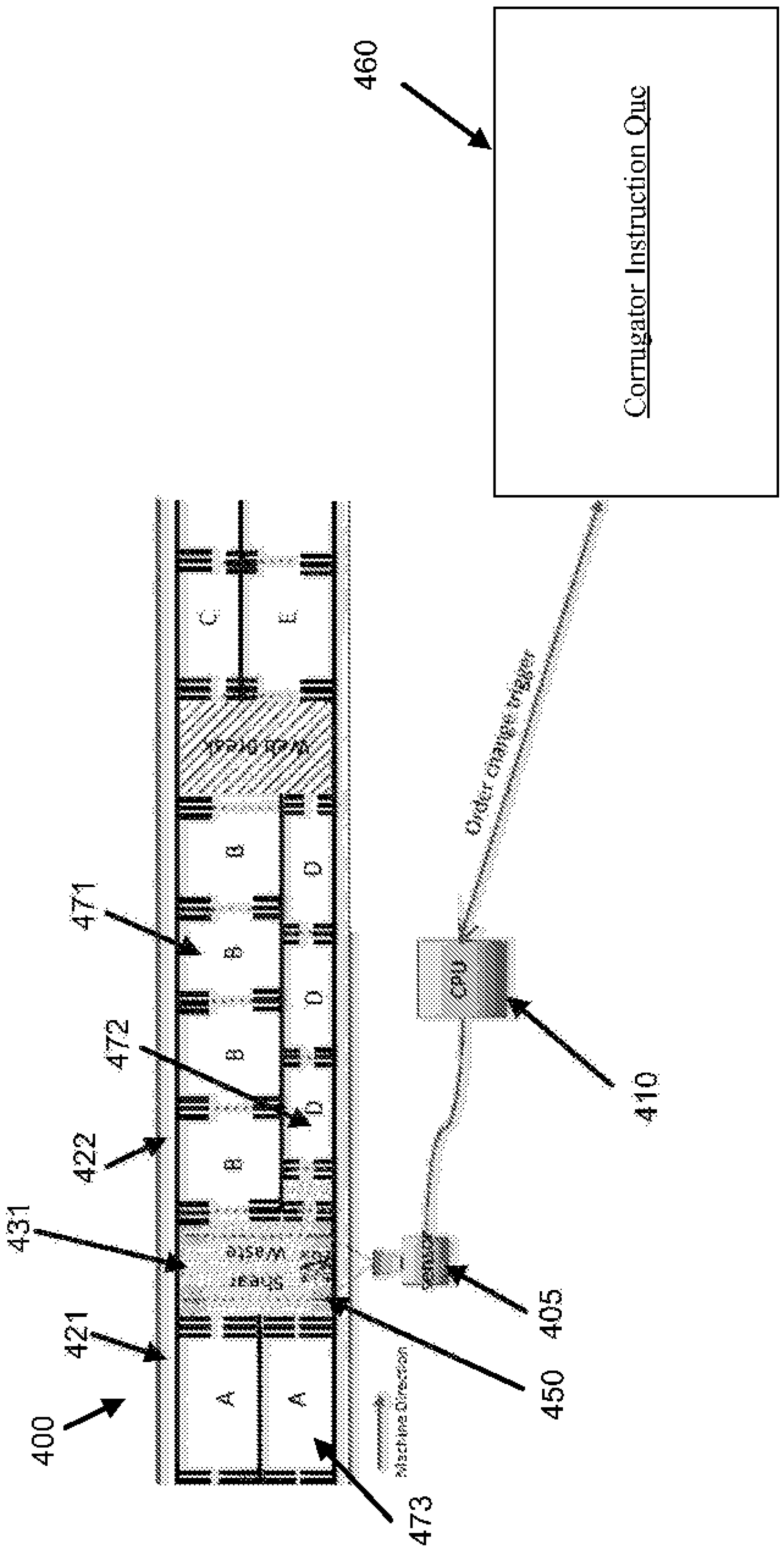
FIG. 6 illustrates another example system for a multi-lane print architecture corrugator, wherein the system detects colored markings in an order change section and determines an order change to obtain new order instructions for an upcoming order, in accordance with some example embodiments discussed herein.

FIG. 6 shows another example corrugator plan 400 with a web structure that is designed to pass through a multi-lane corrugator. The corrugator plan 400 includes a first order section 421, a second order section 422, and an order change (e.g., shear waste) section 431 positioned therebetween. The first order section 421 includes two lanes of a box structure outline A. The second order section 422 includes two lanes, one with a box structure outline B and another with a box structure outline D. Since the dimensions of box structure A 473, box structure B 471, and box structure D 472 all differ, there may need to be different order instructions that each enable operation of the corrugator (and its various components) to accurately cut-out the appropriate box structure outline. Further, due to the corrugator enabling multiple lanes, the corrugator has a slitter that can change position to separate the two lanes (shown in FIG. 3 for example). As shown in the example embodiment, the corrugator plan may include a corrugator instruction que 460 that may be utilized to hold/manage the que of completed, in process, and upcoming orders (and corresponding order instructions).

In the depicted embodiment, a controller (CPU) 410 is connected to a sensor 405. The sensor 405 is configured to detect one or more color markings. In such a regard, the order change section 431 includes color markings 450. As the web runs through the corrugator, the sensor 405 detects the color markings 450. Upon such detection, the controller 410 is configured to determine an order change (e.g., changing from order section A 421 to order section B 422). Accordingly, the controller 410 uses the corrugator plan to pull in or load up the next set of order instructions (e.g., move from orders A to orders B). In some embodiments, the switch to new orders is "blind" such that there is no "confirmation". Such an embodiment may save costs and processing power. Then, the controller 410 may begin instructing the corrugator using the new order instructions—such that the corrugator and its various components (e.g., the knives, slitters, scorers, etc.) operate to cut out the appropriate box structures (e.g., box structure outlines B and D).

Figure 7:
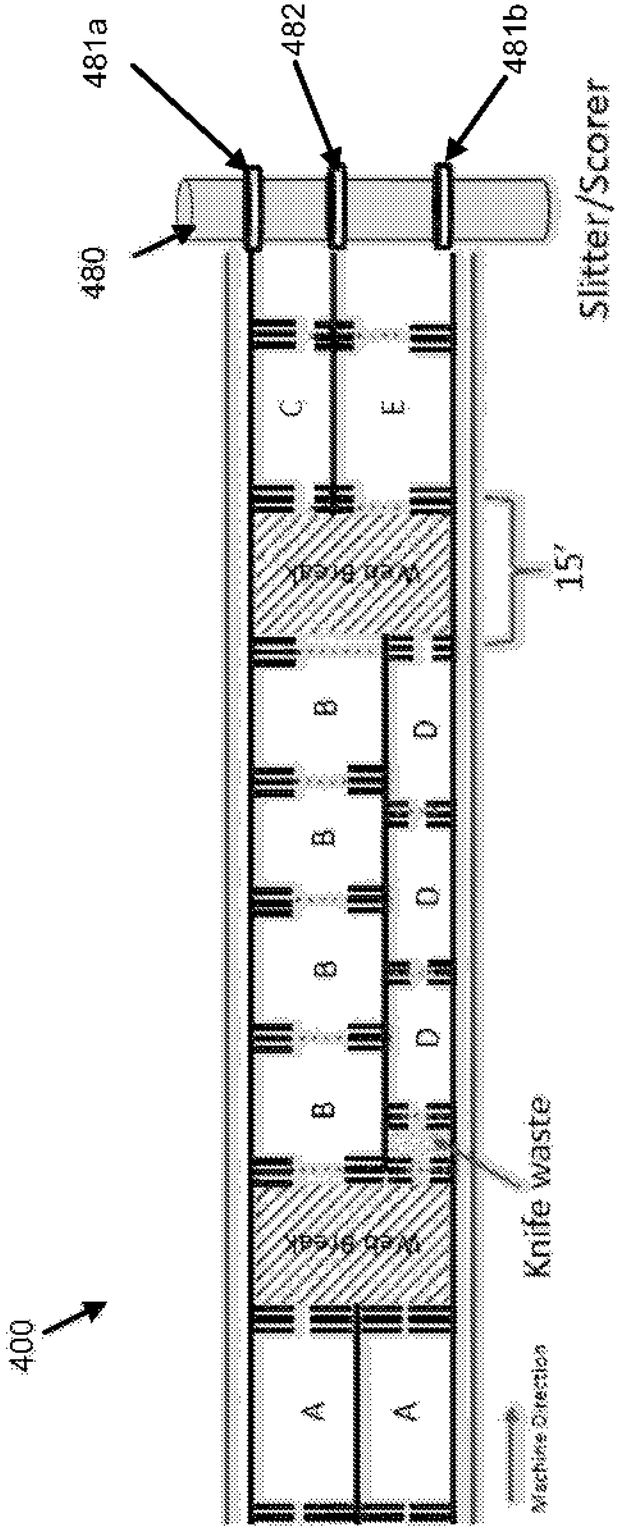
FIG. 7 illustrates another example system for detecting colored markings for determining an order change and obtaining new order instructions for an upcoming order, wherein the one or more sensors are formed with the slitter/scorer, in accordance with some example embodiments discussed herein.

FIG. 7 illustrates another example system with a slitter/scorer 480 that can be utilized to enable efficient operation of the system. In this regard, the position of the outer slitters 481*a*, 481*b* and the position of the central slitter 482 can quickly adjust, such as during the web break (e.g., order change section).

Figure 8:
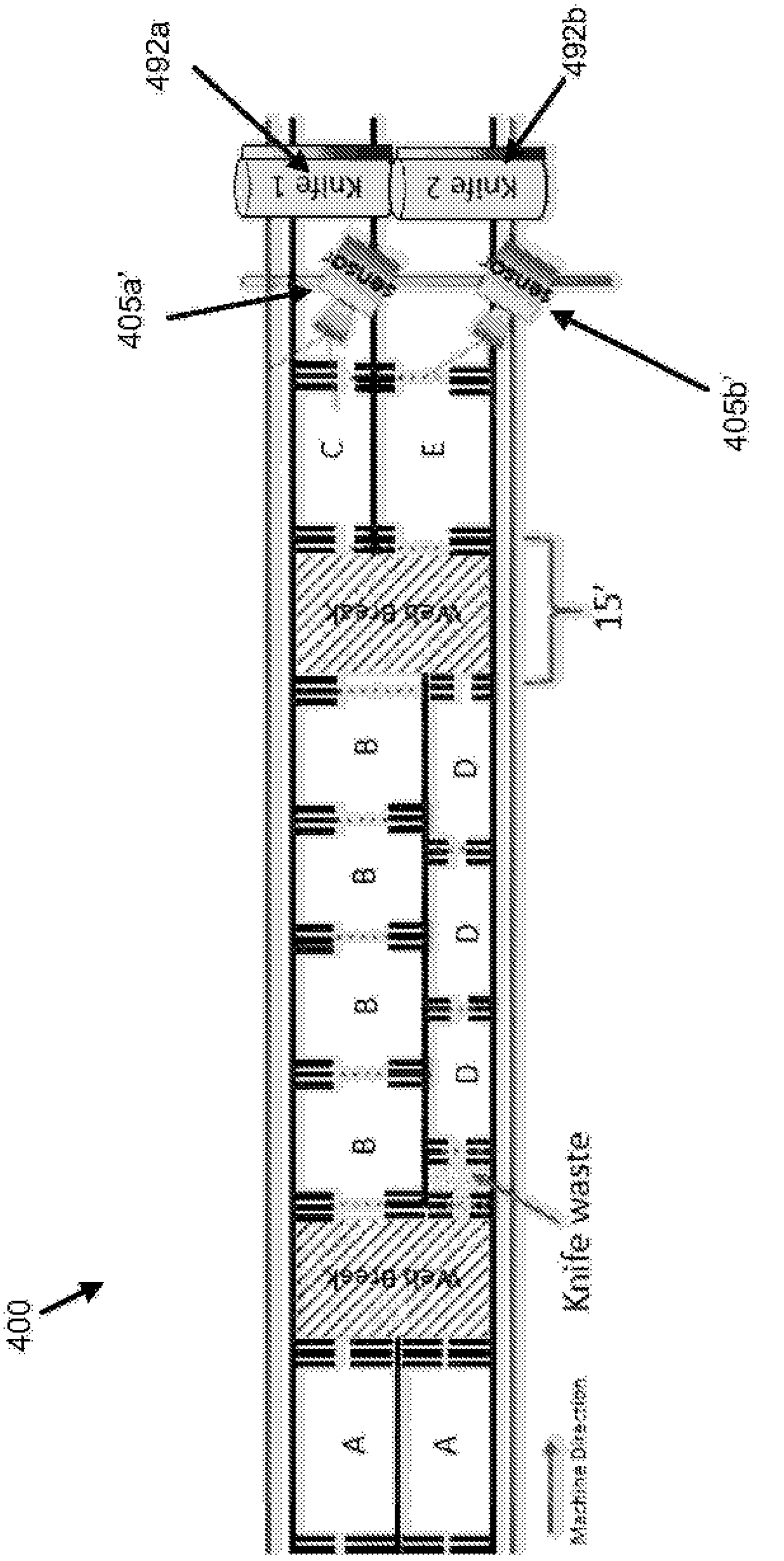
FIG. 8 illustrates another example system for detecting colored markings for determining an order change and obtaining new order instructions for an upcoming order, wherein the sensors are positioned upstream of two knives, in accordance with some example embodiments discussed herein.

FIG. 8 illustrates another example system where two sensors 405*a*'. 405*b*' for detecting the color markings are positioned near two knives 492*a*, 492*b* to enable efficient change over for operation of the knives. In the depicted embodiment, the sensors 405*a*', 405*b*' are configured to move in the cross-direction to enable detecting of the cut-to-mark markings and the color markings (e.g., when appropriate).

Figure 9:
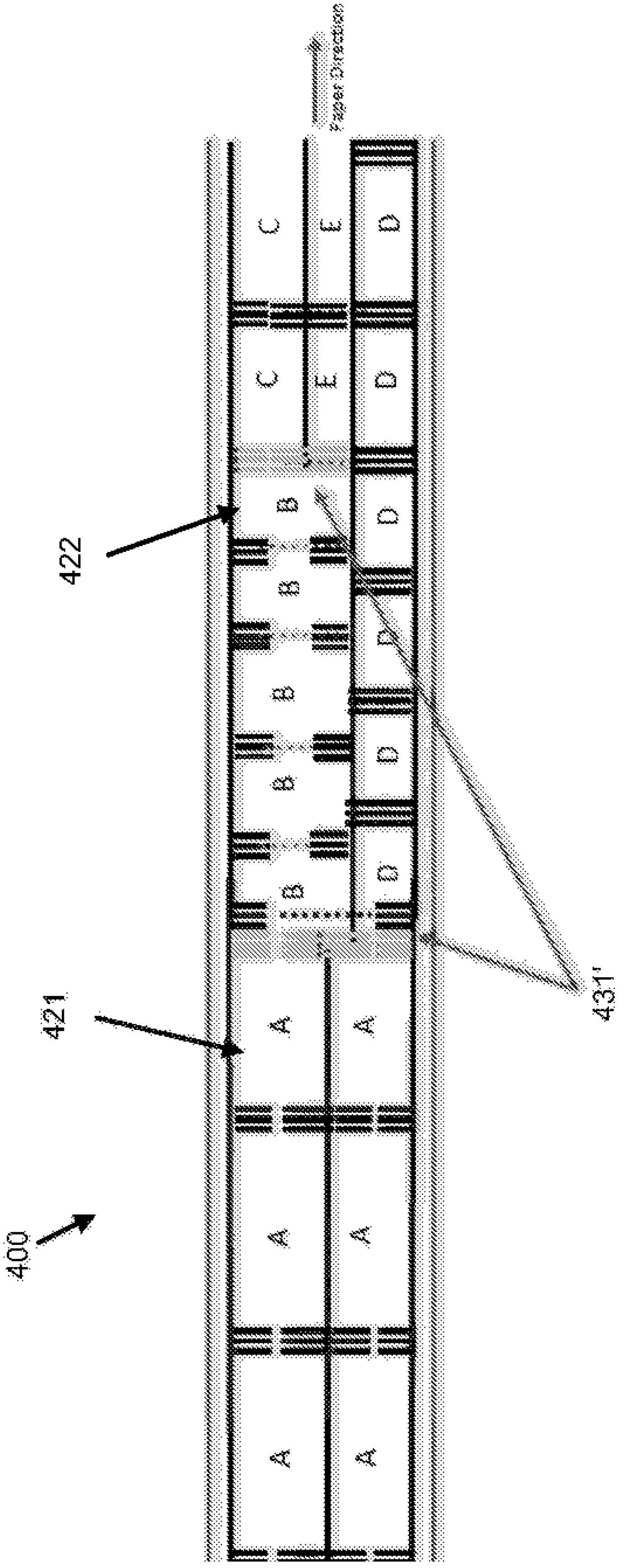
FIG. 9 illustrates another example system for detecting colored markings for determining an order change and obtaining new order instructions for an upcoming order, wherein the order change section is in the form of an order change line, in accordance with some example embodiments discussed herein.

FIG. 9 illustrates an example web that includes an order change section 431' in the form of an order change line. In such example embodiments, the shear waste section is replaced with an incision line—thereby eliminating the section of waste caused by removal of the shear waste section. In some embodiments, the one or more sensors/detectors are configured to detect the color marking(s) and the controller is configured to determine an order change in conjunction with an order change incision.

Using Computer Readable Markers for Roll Position Confirmation

In some embodiments, readable markers may be present on, at least, some of the web (e.g., on the sheet or box structures). Such readable markers (e.g., bar codes. QR codes, etc.) may, in some embodiments, be configured to enable confirmation of the position of the corrugator plan. Additionally, in some embodiments, the readable markers may enable tracking of the orders. Additionally or alternatively, the readable markers may supplement the color markers and enable some control of the corrugator upon being read and/or may be utilized for downstream processes after the corrugator (e.g., for tracking and other logistics).

In some embodiments, by "reading" the marker and querying the corrugator plan and/or associated reel map, the corrugator controller can determine the actual position of the board web in the corrugator. This can be checked against the intended (e.g., scheduled or theoretical) position of the board web in the corrugator. Such information may, in some cases, be displayed to an operator for making a determination as to whether to stop (e.g., through an emergency stop) and/or change operation of the corrugator. In some embodiments, the actual position and the theoretical position may be displayed side-by-side as a visual representation for the operator to make a comparison. In some embodiments, automated comparisons may be performed and one or more indications could be provided to the operator. Similarly, an automated stop or change in operation of the corrugator could be implemented if there is a difference between the actual position and the theoretical position.

Figure 10:
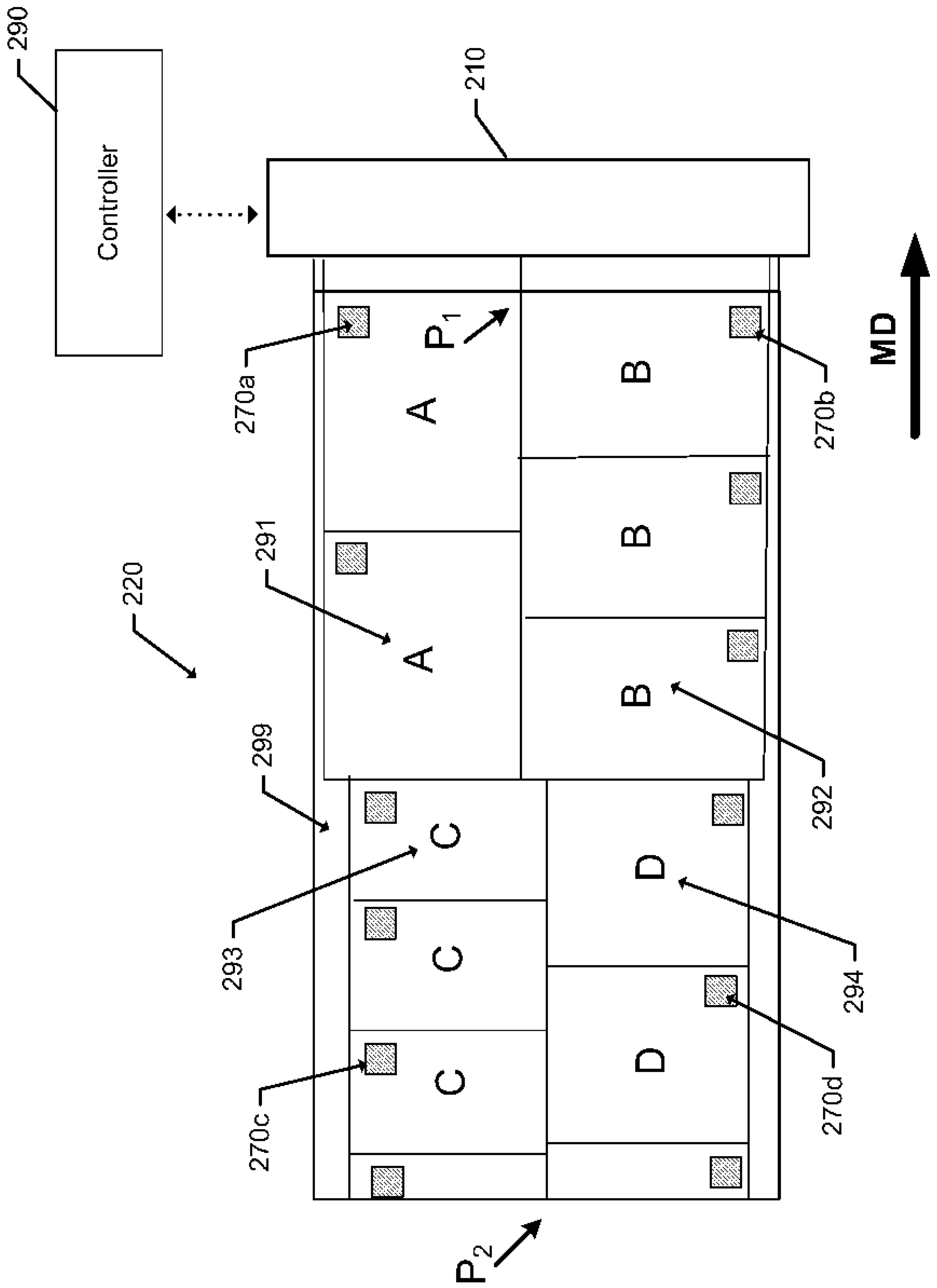
FIG. 10 shows an example portion of a layered corrugated board web, wherein the sheet or box structure areas of the board web each include a readable marker, in accordance with example embodiments described herein.
Figure 11:
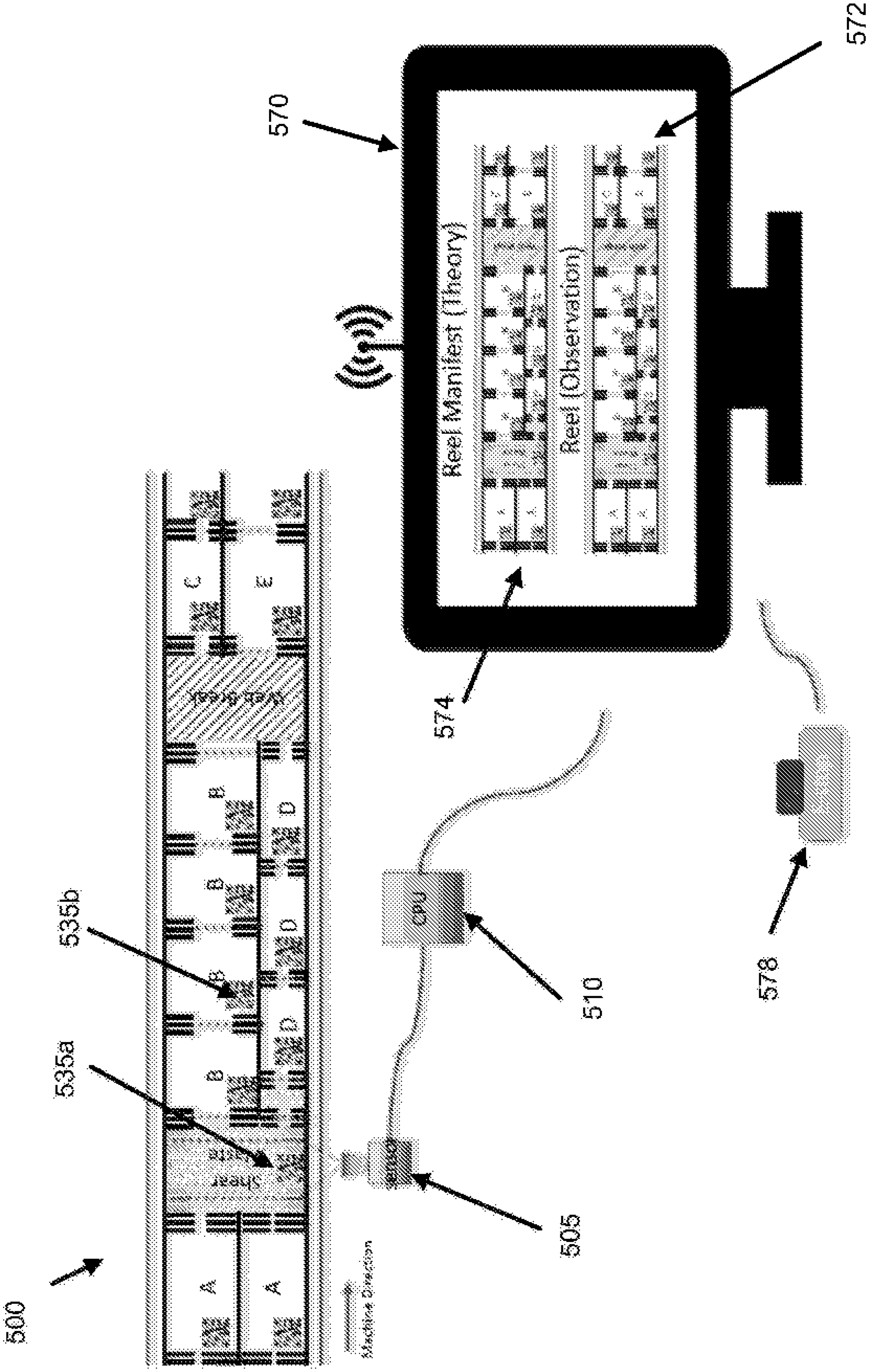
FIG. 11 illustrates an example system for detecting computer readable markings and providing a display with an actual position of the corrugator plan side-by-side to an intended position of the corrugator plan, in accordance with some example embodiments discussed herein.

FIG. 10 illustrates an example layered corrugated board web 220 that includes readable markers 270*a-d*. In the depicted embodiment, each sheet or box structure type includes a different readable marker. For example, sheet or box structure A, 291 has a corresponding readable marker 270*a*; sheet or box structure B, 292 has a corresponding readable marker 270*b*; sheet or box structure C, 293 has a corresponding readable marker 270*c*; and sheet or box structure D. 294 has a corresponding readable marker 270*d*. Though the depicted embodiment shows the readable marker positioned within a sheet or box structure, in some embodiments, the readable marker may be positioned in the margins or other waste area. For example, one or more readable markers can be positioned in the order change section, such as shown in FIG. 11. In some embodiments, one or more readable markers may be positioned at the beginning of or end of an order section. In some embodiments, the only readable markers on the web that are used for operation of the corrugator may be positioned in one of the order change section, at the beginning of an order section, or at the end of an order section—thereby minimizing the number of readable markers needed for operation of the corrugator.

As shown in the depicted embodiment, one or more detectors 210 may be positioned along the pathway through the corrugator. In this regard, the one or more detectors 210 may be configured to "read" or detect the marker and provide that information to the controller 290.

FIG. 11 illustrates an example system that enables confirmation of the position of the corrugator plan (e.g., corrugator schedule) through the corrugator. In the depicted embodiment, the web 500 is passing through the corrugator. One or more readable markers 535*a*, 535*b* are positioned along the web and configured to be "read" by one or more sensors 505. Based on the read marker, the controller 510 can determine the actual position of the corrugator plan, such as by referencing the corrugator plan and matching up the read marker. In the depicted embodiment, the controller 510 may cause a representation 572 of the actual position of the corrugator plan of the web 500 to be presented on a display 570. Additionally, the controller 510 may determine the theoretical (e.g., intended, scheduled, expected) position of the corrugator plan and cause a representation 574 of the theoretical position of the corrugator plan to also be presented on the display 570. In some such embodiments, the representations of each of the actual position and the theoretical position may be presented side-by-side to enable a user of the display to quickly/easily determine if the corrugator plan is "off"—e.g., there is a difference between the actual position and the theoretical position.

In some embodiments, an emergency stop feature 578 may be present to enable the operator to effect an emergency stop of the corrugator—such as in response to determining a difference between the actual position and the theoretical position. Additionally or alternatively, the operator may cause a change in the corrugator operation based on the observed difference between the actual position of the corrugator plan and the theoretical position of the corrugator plan. For example, the operator may select the appropriate set of order instructions for the corrugator to be using based on the actual position that is observed.

Although a visual representation of the corrugator plan is shown in FIG. 11, some embodiments of the present invention contemplate providing other representations, such as the actual order instructions or a table indicating at least some portion of the order instructions. In such an example embodiment, an operator may easily confirm that the corrugator is operating using the correct order instructions.

In some embodiments, the controller may be configured to compare the actual position of the corrugator plan with the theoretical position of the corrugator plan and provide one or more indications/instructions to a user of the display 570. For example, the controller may highlight one or more portions of the representation of the actual and/or theoretical corrugator plan to highlight a possible difference to the user. As another example, the controller may provide a message that indicates that there is a difference between the actual position and the theoretical position. Additionally or alternatively, the controller may be configured to determine one or more remedies that may be implemented (e.g., by the operator and/or automatically) to correct the position of the web and/or operation of the corrugator.

Though some of the above described embodiments incorporate a user, in some embodiments, in addition to or in the alternative of a user, the controller may be configured to automatically cause the corrugator to stop operation and/or change operation in response to detecting a difference between the actual position of the corrugator plan and the theoretical position of the corrugator plan.

Example Platform for Managing Corrugated Box Manufacturing

Figure 12:
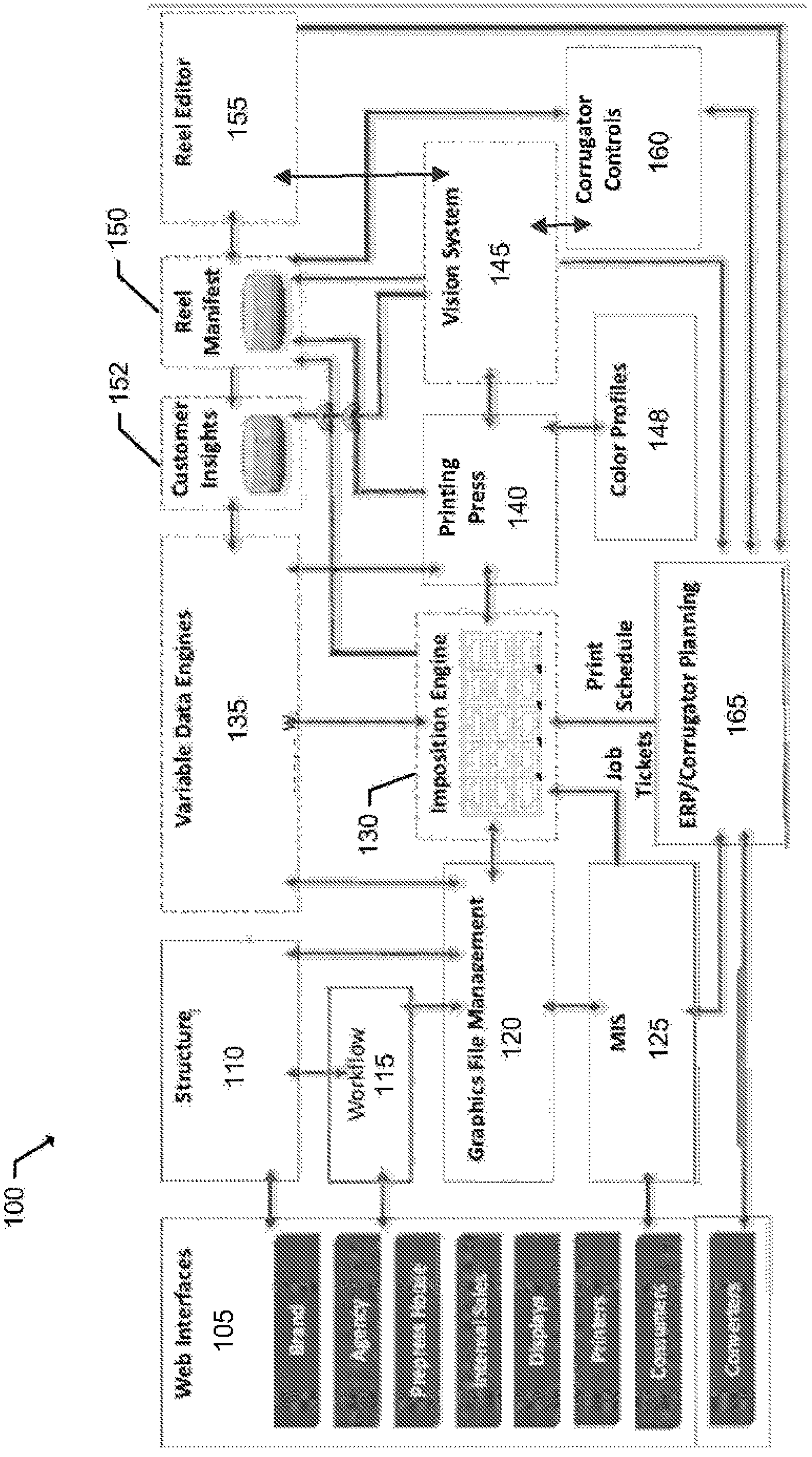
FIG. 12 shows an example platform for various aspects of a corrugated box manufacturing process, in accordance with example embodiments described herein.

FIG. 12 illustrates an example platform 100 for managing corrugated box manufacturing according to various embodiments of the present invention. As is consistent with embodiments described herein, however, some embodiments of the present invention contemplate use of the platform (or various aspects of the platform) for other product manufacturing, such as folded carton, beverage containers, labels, flexible paper, industrial bags, plates, cups, décor, and many others.

The platform 100 includes a number of platform modules that interact with each other to form an integrated platform that provides efficient manufacturing processes. In the depicted embodiment, the platform 100 includes a web interface module 105, a structure module 110, a graphics file workflow module 115, a graphics file management module 120, a management information systems (MIS) module 125, an imposition engine module 130, a variable data engine module 135, a press module 140, a color management module 148, a press vision system module 145, a reel manifest module 150, a customer insights module 152, a reel editor module 155, a corrugator controls module 160, and an enterprise resource planning (ERP)/corrugator planning module 165. As described herein, the various modules each contain features that are designed to work together to provide an integrated, efficient platform 100 for manufacturing corrugated sheet or box structures for customers. In some embodiments, the controller 90 may be configured to communicate with and/or control operation of many of the various modules. While the depicted embodiment shows various particular modules, some embodiments of the present invention contemplate many variations, including additional modules and combinations in whole or part of shown modules to form a platform.

The web interface module 105 may be configured to provide for interaction between customers, users, and the platform 100. For example, the web interface module 105 may be configured to provide an interface for a customer to provide information to the platform 100, such as orders, changes to orders, payments, etc. The web interface module may also enable additional features, such as enabling a customer to print samples, upload their own art/images, track orders, among other things. Additionally, however, the web interface module 105 may be helpful for internal use, such as for tracking sales. The internal web interface may display pertinent information to the company, such as trends, etc. The web interface module 105 may communicate, for example, with the structure module 110, the workflow module 115, the management information systems module 125, and/or the ERP/corrugator planning module 165.

The structure module 110 may be configured to enable selection and design of the sheet or box structures planned for manufacture. For example, the structure module 110 may enable selection of the types of boxes (e.g., the material, number of layers, flute medium, etc.). Additionally, the size and shape of the sheet or box structure may be configured using the structure module 110. In some embodiments, preferred sheet or box structure specifications may be stored by the structure module 110. Further, rules or other constraints may be communicated to the customer and/or utilized in determination of the sheet or box structure specifications. The structure module 110 may communicate, for example, with the web interface module 105, the workflow module 115, and/or the graphics file management module 120.

The workflow module 115 may be configured to help process the flow of graphics orders and facilitate input of the orders into the structure module 110 and the graphics file management module 120. In this regard, the workflow module 115 may communicate with the web interface module 105, the structure module 110, and/or the graphics file management module 120.

The graphics file management module 120 may be configured to help process the graphics files for use in designing and printing on the sheet or box structures. For example, the graphics file management module 120 may include a repository of available images. Likewise, the graphics file management module 120 may store new images uploaded by the customer. Further, the graphics file management module 120 may include rules or other feature constraints that can be communicated to the customer and/or implemented when forming the orders. The graphics file management module 120 may communicate, for example, with the structure module 110, the workflow module 115, the management information system module 125, the color management module 148, and/or the imposition engine 130.

The management information system module 125 may be configured to store, process, and organize the information for the platform 100. For example, the management information systems module 125 is configured to receive and organize the orders, other customer requests, and internal information from the web interface module 105. Further, the data from the graphics file management module 120, imposition engine module 130, and ERP/corrugator planning module 165 may be stored and organized using the management information systems module 125. The management information systems module 125 may communicate, for example, with the web interface module 105, the graphics file management module 120, the imposition engine 130, and/or the ERP/corrugator planning module 165.

The enterprise resource planning (ERP)/corrugator planning module 165 may be configured to facilitate planning and implementation of the manufacturing process. In this regard, the ERP/corrugator planning module 165 may receive data from various features of the platform 100 and process the information to plan out efficient manufacturing processes across the entire platform. For example, the ERP/corrugator planning module 165 may receive data from the web interface module 105, the management information systems module 125, the press module 140, the vision system module 145, the corrugator controls module 160, and reel editor module 155 to inform planning for future jobs. As an example, the management information systems module 125 may provide order information to the ERP/corrugator planning module 165, which can be utilized to form job tickets for the imposition engine module 130. The ERP/corrugator planning module 165 may also be configured to enable printing of schedules for jobs etc.—which may be used for tracking or other purposes. Such information, for example, may be used to provide information back to the customer, such as through the web interface module 105. The ERP/corrugator planning module 165 may communicate, for example, with the web interface module 105, the management information systems module 125, the imposition engine module 130, the press module 140, the vision system module 145, the reel editor module 155, and/or the corrugator controls module 160.

The imposition engine module 130 may be configured to plan out imposition of print objects (e.g., images or markers) and other variable data on the corrugated board web (e.g., roll of web product). For example, the imposition engine module 130 may gather ready job tickets (e.g., customer orders), such as from the management information systems module 125 and/or ERP/corrugator planning module 165, for imposition across rolls of corrugated board web. Using the job tickets, the imposition engine module 130 may determine layouts for the corrugated board webs that minimize waste and improve processes. In order to plan out and finalize impositions, the imposition engine module 130 may receive information from various other modules, such as the graphics file management module 120, the variable data engine module 135, and the reel manifest module 150.

In some embodiments, the imposition engine module 130 may provide the ability to test roll layouts and finalize acceptable roll layouts. In this regard, formation of the layouts may be optimized based on many different factors, including, for example, roll/sheet/finished box requirements, press limitations, downstream corrugation, die-cut optimization, among other things. After finalization, the imposition engine module 130 may be configured to pass the imposed layout to the press module 140 for printing.

The imposition engine module 130 may communicate, for example, with the graphics file management module 120, the management information systems module 125, the ERP/corrugator planning module 165, the variable data engine module 135, the reel manifest module 155, and the press module 140.

The variable data engine module 135 may be configured to manage markers and other variable data through the manufacturing process. As described herein, some embodiments of the present invention contemplate use of markers for automated control during the manufacturing process, such for automated control/operation of the corrugator. Depending on the configuration of the manufacturing process, different markers or other variable data may be utilized to achieve automated control. The variable data engine module 135 may be configured to track, organize, determine, and report on such markers or other variable data.

In some embodiments, the variable data engine module 135 may be a web-based back-office function that assigns/allocates, references, and/or reports on variable data/marker information utilization. Such a module may enable generation and allocation of group (multi-use) individual barcodes, quick response (QR) codes, watermarks, color markers, and general variable data. In some embodiments, the variable data engine module 135 may assign/allocate variable data/markers by various entities, such as brand, product type, printer type, converter type, corrugator, logistics supply chain, or other factors.

In some embodiments, the variable data engine module 135 may transfer such information to the imposition engine module 130 for imposing on the board or web layout. In some embodiments, downstream information can be provided back to and utilized by the variable data engine module 135, such as information from the vision system module 145, reel editor module 155, corrugator, finishing equipment, logistics control, retailer, brand, and/or customer. Likewise, status updates can be provided to and from the variable data engine module 135.

In some embodiments, the data generated by the variable data engine module 135 may be tracked and utilized for reporting and determination of optimized processes. Further analytics and usage reporting may be generated. Along these lines, such information and learnings may be applicable to manufacturing of other products, such as also contemplated herein.

The variable data engine module 135 may communicate, for example, with the graphics file management module 120, the imposition engine module 130, the customer insights module 152, and the press module 140.

The press module 140 may be configured to print objects (e.g., images and markers) on the corrugated board or web, such as during the printing phase 30 described herein. Depending on capabilities of the press, different image qualities and efficiencies may be achieved. The press module 140 may be configured to communicate with, for example, the imposition engine module 130, the variable data engine module 135, the reel manifest module 150, the vision system module 145, and the color profiles module 148.

The color management module 148 may be configured to store and provide color profile information for the press module 140. In this regard, the color profiles module 148 may manage specific color profiles for customers, presses, substrates, or other requirements, that are then used by the press during printing. The color management module 148 may be configured to communicate with, for example, the graphics file management module 120 and the press module 140.

The vision system module 145 may be configured to perform many different types of vision (e.g., detection) related functions during the manufacturing process 10. In this regard, the vision system module 145 may be configured for use during the printing process and/or during use of the corrugator or other components of the manufacturing process. In describing such an example vision system module 145, some embodiments of the present invention contemplate separating described functions of the vision system module. For example, a portion of the vision system module 145 may be used during the printing process, while another portion of the vision system module 145 may be used in conjunction with operation of the corrugator. Likewise, there may be separate functions performed by separate vision system related components (e.g., a visual inspection system may inspect the sheet or box structures for accuracy and a detector may detect one or more markers). As such, though described as one module, the following description is not meant to limit the structure of the modules of the platform 10, as there may be separate vision related modules as appropriate.

The vision system module 145 may be configured to detect information during the manufacturing process, such as during use of the printing process. In some embodiments, the vision system module 145 may be configured to detect possible defects and/or confirm accuracy of print jobs. In such a regard, high quality can be maintained (e.g., confirming color consistency on orders). For example, the vision system module 145 may detect defects, such as serious banding, print registration color-to-color, spit-on-page issues, bar/QR code scanability, over-print varnish issues.

In some embodiments, the vision system module 145 may be configured to detect information during the manufacturing process 10, including during the printing phase 30, the reel editor phase 40, and/or during use of the corrugator 50. For example, the vision system module 145 may detect any defects or issues with the cuts or other functions of the corrugator. Additionally, the vision system module 145 may communicate potential issues in real time to the controller 90 to adjust operation of the corrugator to address any issues. By detecting and communicating such issues, the controller 90 may adapt operation to avoid unnecessary waste. Along these lines, in some embodiments, the controller 90 may work with the various modules of the platform 100 to switch production, such as to a different portion of a corrugator plan and/or associated reel map to avoid down time. In this regard, the vision system module 145 provides for the ability for on-the-fly adjustments during the manufacturing process.

In some embodiments, the vision system module 145 may be configured to detect various markers as the board web is passed through various phases of the manufacturing process. Based on the detected markers, the vision system module 145 may provide information to the controller 90 for operation/control accordingly. Further, such information can be used for tracking orders and status.

In some embodiments, photographs (e.g., digital images) can be taken and stored for evidence or additional learning. In some embodiments, the photographs could be automatically provided to the customer for verification and auditing purposes.

In some embodiments, the vision system module 145 is configured to update the graphics file management module 120 to store and/or access golden reference images for print quality comparison.

The vision system module 145 may be configured to communicate, for example, with the press module 140, the customer insights module 152, the reel manifest module 150, and/or the ERP/corrugator planning module 165.

The customer insights module 152 may be configured to determine insights that may be useful for obtaining efficiencies, such as for a customer. The insights may be related to, for example, trends for customers, trends that the customer may find desirable, suggestions for the customer for future orders, etc. Additionally or alternatively, the insights may be related to achieving efficiencies for preparing product for specific customers. For example, the customer may indicate that certain "defects" are not important or not really defects as recognized by the vision system module 145.

In some embodiments, the customer insights module 152 may track and utilize non-customer specific information, such as for determining general efficiencies of process. For example, the module may track variable data/marker usage, reel map trends and usages, printer data, print head usage, paper waste, etc., such as to help form insights to increase efficient manufacturing processes.

The customer insights module 152 may be configured to communicate with, for example, the variable data engine 135, the vision system module 145, and/or the reel manifest module 150.

The reel manifest module 150 may be configured to store and/or track the process flow (e.g., reel map) for the manufacturing process. The reel manifest module 150 works with the imposition engine module 130 to store the job layouts for operation of the corrugator. The reel manifest 150 may be checked, such as by the controller 90 and/or corrugator controls module 160, to help determine the current position on a reel map—such as in response to receiving a detection (e.g., a marker or a defect) from the vision system module 145. Further, the corresponding information needed to operate the corrugator according to the reel map may be stored at the reel manifest module 150 and provided to the controller 90/corrugator controls module 160 so that the controller 90/corrugator controls module 160 may operate the corrugator accordingly. The reel manifest module 150 may work with the reel editor module 155 to edit the reel map in real time, such as described herein. The reel manifest module 150 may be configured to communicate with, for example, the customer insights module 152, the imposition engine module 130, the press module 140, the vision system module 145, the corrugator controls module 160, and/or the reel editor module 155.

The reel editor module 155 may be configured to enable editing of the process flow, such as the reel map. In this regard, in some embodiments, the reel editor module 155 interacts with the reel manifest module 150 to update the stored reel map. In some embodiments, the reel editor module 155 may work with the vision system module 145 to identify unnecessary waste, which can be edited from the reel map, such as based on instructions for the controller 90. Such example information can also be provided to the ERP/corrugator planning module 165 to update the reel map and/or for consideration in future jobs. The reel editor module 155 may be configured to communicate, for example, with the reel manifest module 150, the vision system module 145, and the ERP/corrugator planning module 165.

The corrugator controls module 160 may be configured to control operation of the corrugator, such as described herein. In some embodiments, the corrugator controls module 160 may work with one or more cameras/detectors to detect information (e.g., markers or defects) that can be used to control/adjust operation of the corrugator. For example, the cameras/detectors may detect a marker and the corrugator controls module 160 may determine how to operate the corrugator based on the detected marker (and/or the corresponding position of the reel map). Then, based on the determined desired operations, the corrugator controls module 160 may cause operation of the corrugator. For example, the corrugator controls module 160 may cause one or more knives to change position and/or perform a cut. Additional information regarding contemplated control through detection of markers is provided in greater detail herein. The corrugator controls module 160 may be configured to communicate with, for example, the reel manifest module 150, the vision system module 145, and the ERP/corrugator planning module 165.

In some embodiments, other components/machines and their corresponding controls may replace the corrugator, such as components/machines geared toward manufacturing other products.

Example Other Product Manufacturing Processes

As noted herein, some embodiments contemplate systems for controlling manufacturing of various products, such as various paper-based products, including corrugated boxes, folded carton, labels, flexible paper, industrial bags, plates, cups, décor, and many others. FIGS. 13-16 illustrate block diagrams of various example other paper-based product manufacturing contemplated by various embodiments described herein. In this regard, some embodiments of the present invention contemplate one or more controllers (e.g., controller 90) that can be utilized in manufacturing of such various products, such as described herein.

Figure 13:
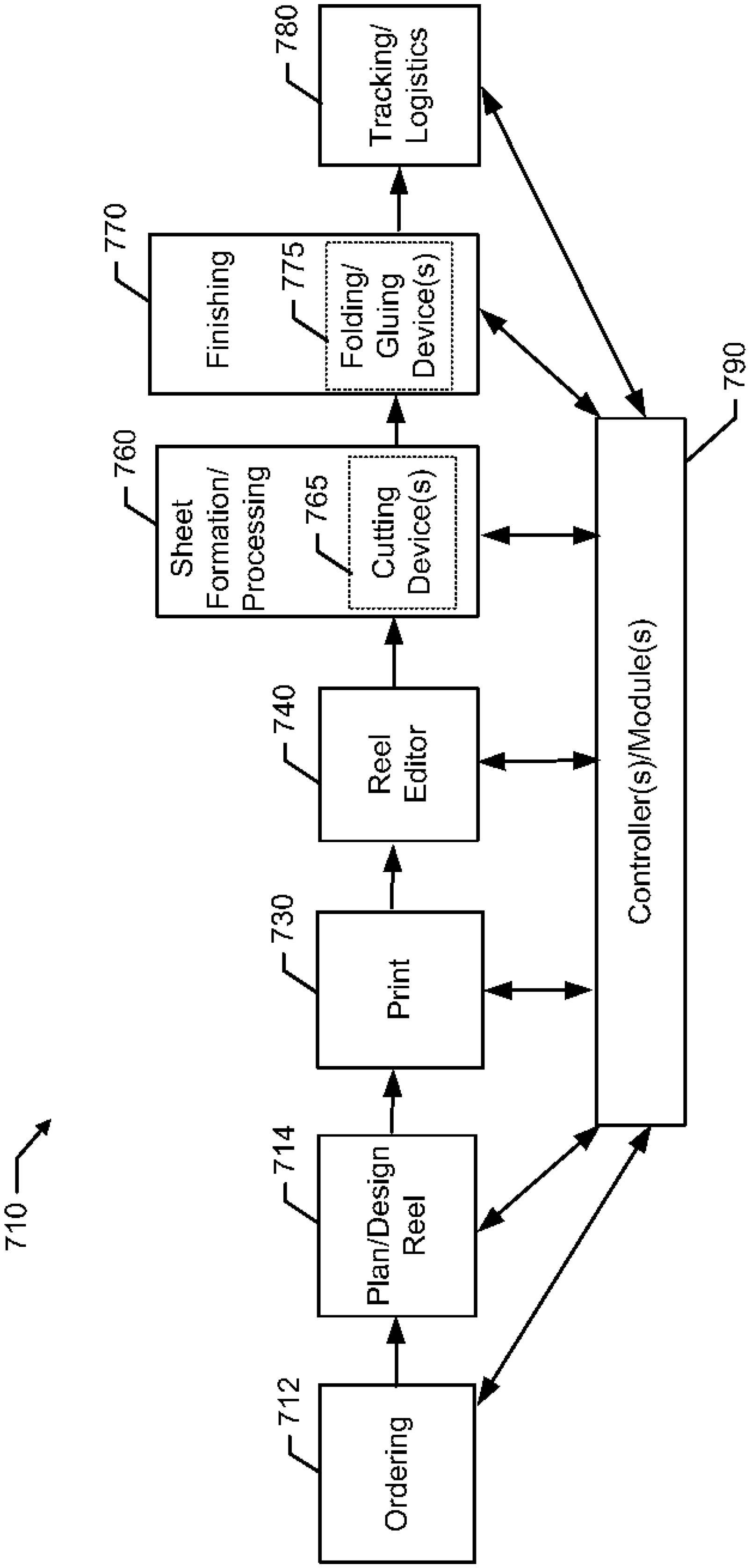
FIG. 13 shows a block diagram of an example folded carton manufacturing process, in accordance with some embodiments discussed herein.

FIG. 13 shows a block diagram of an example folded carton manufacturing process according to various embodiments of the present invention. The manufacturing process 710 includes a number of phases that result in a finished folded carton that is shaped, formed, and printed per the customer's order. The process 710 may include an ordering phase 712, a planning phase 714, a print phase 730, a reel editor phase 740, a sheet formation/processing phase 760, a finishing phase 770, and a tracking/logistics phase 780. Such phases may be similar to the phases described with respect to the manufacturing phase 10 of FIGS. 1A-1B. In some embodiments, less or more phases or different orders of phases are contemplated. Depending on the desired configuration, one or more controller(s) 790 may be used to control one or more various phases (e.g., various systems/devices therein) of the manufacturing process 710. In some embodiments, one device/system may encompass multiple phases, such as two or more of the printing phase 730, the reel editor phase 740, the sheet formation/processing phase 760, and the finishing phase 770.

Figure 1B:
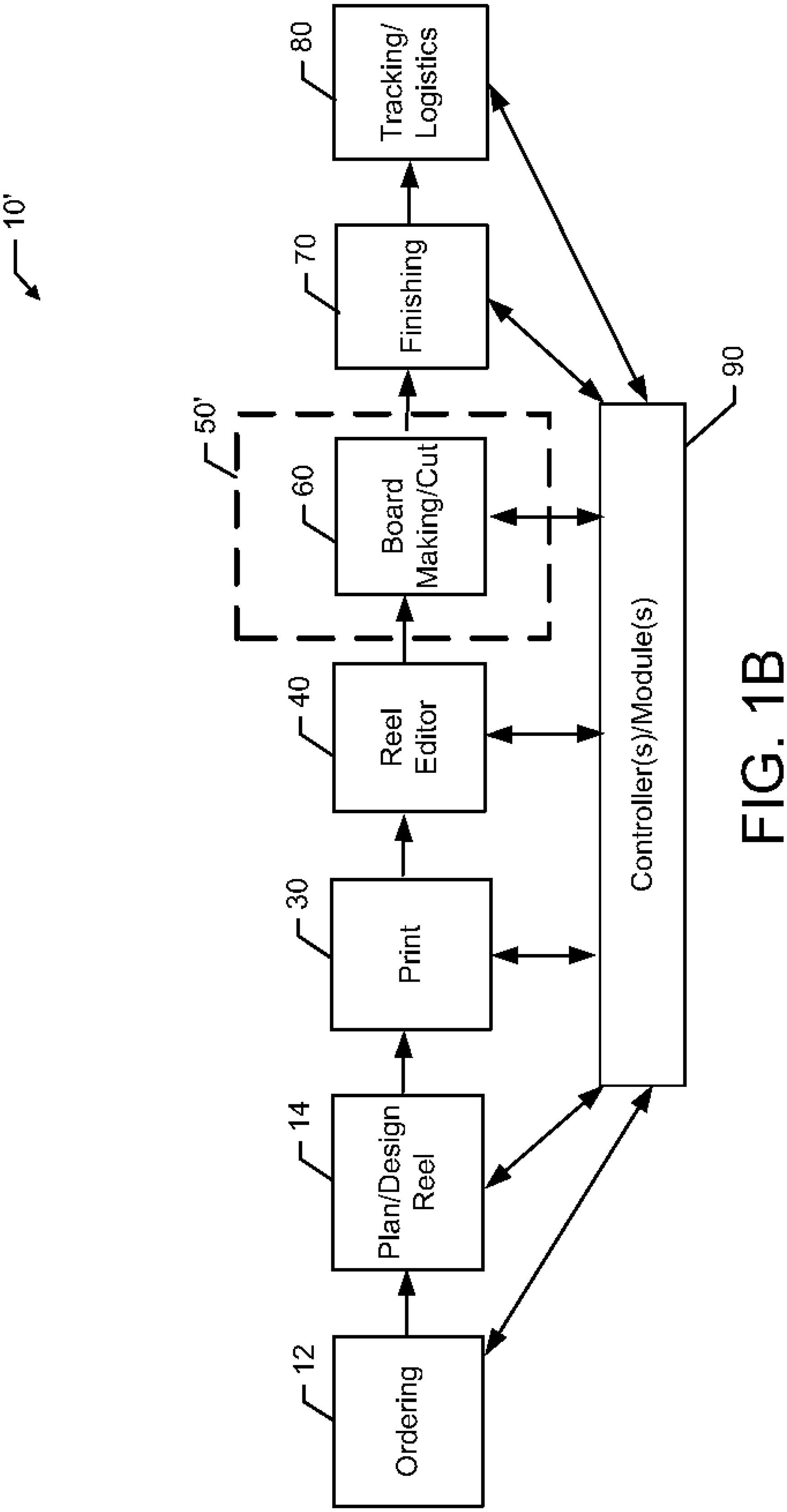
FIG. 1B shows a block diagram of an example corrugated sheet or box manufacturing process with print off-line, before the corrugator, in accordance with some embodiments discussed herein.
Figure 2A:
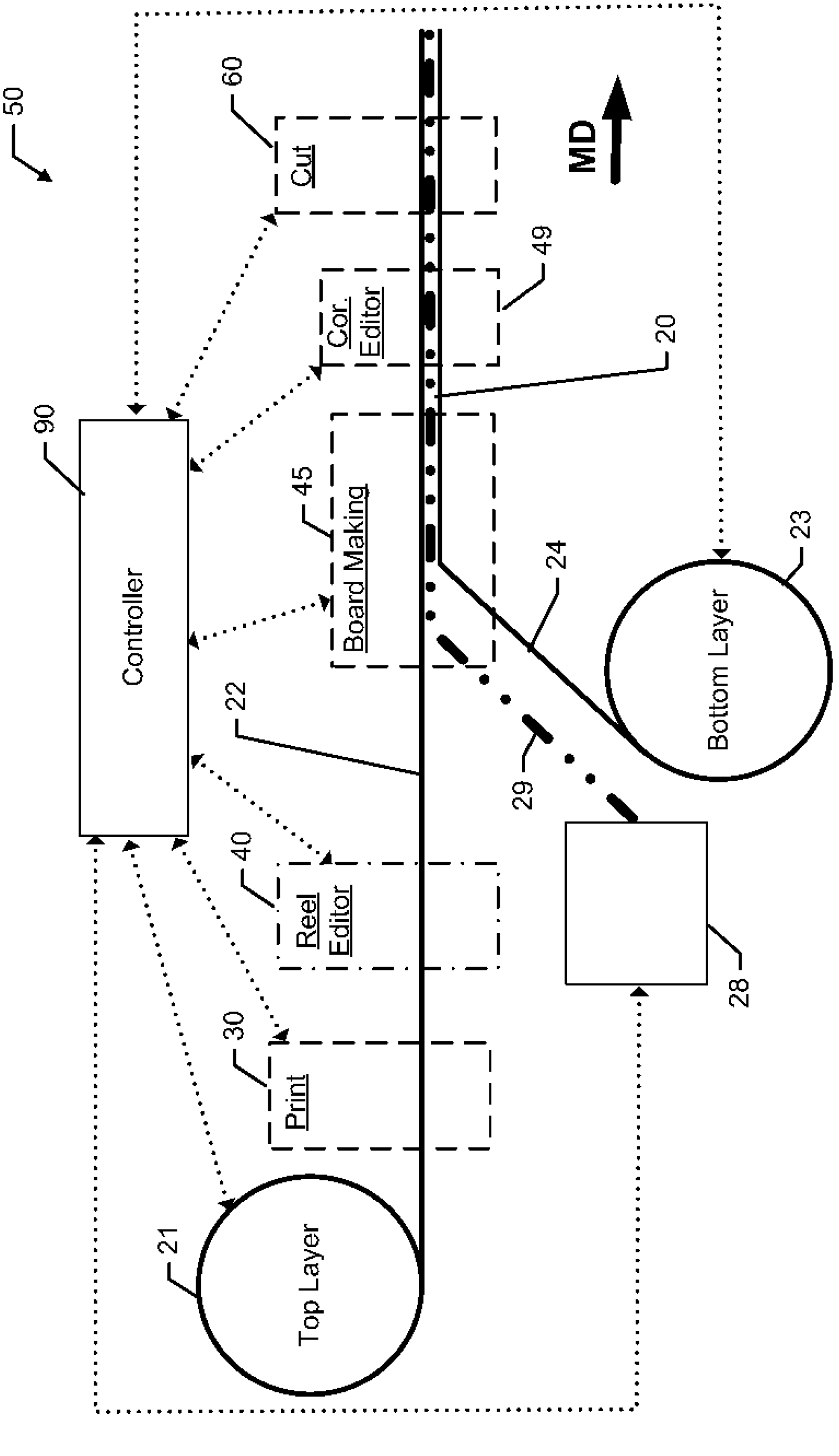
FIG. 2A illustrates a portion of the corrugated box manufacturing process with print in-line with the corrugator, in accordance with some embodiments discussed herein.
Figure 2B:
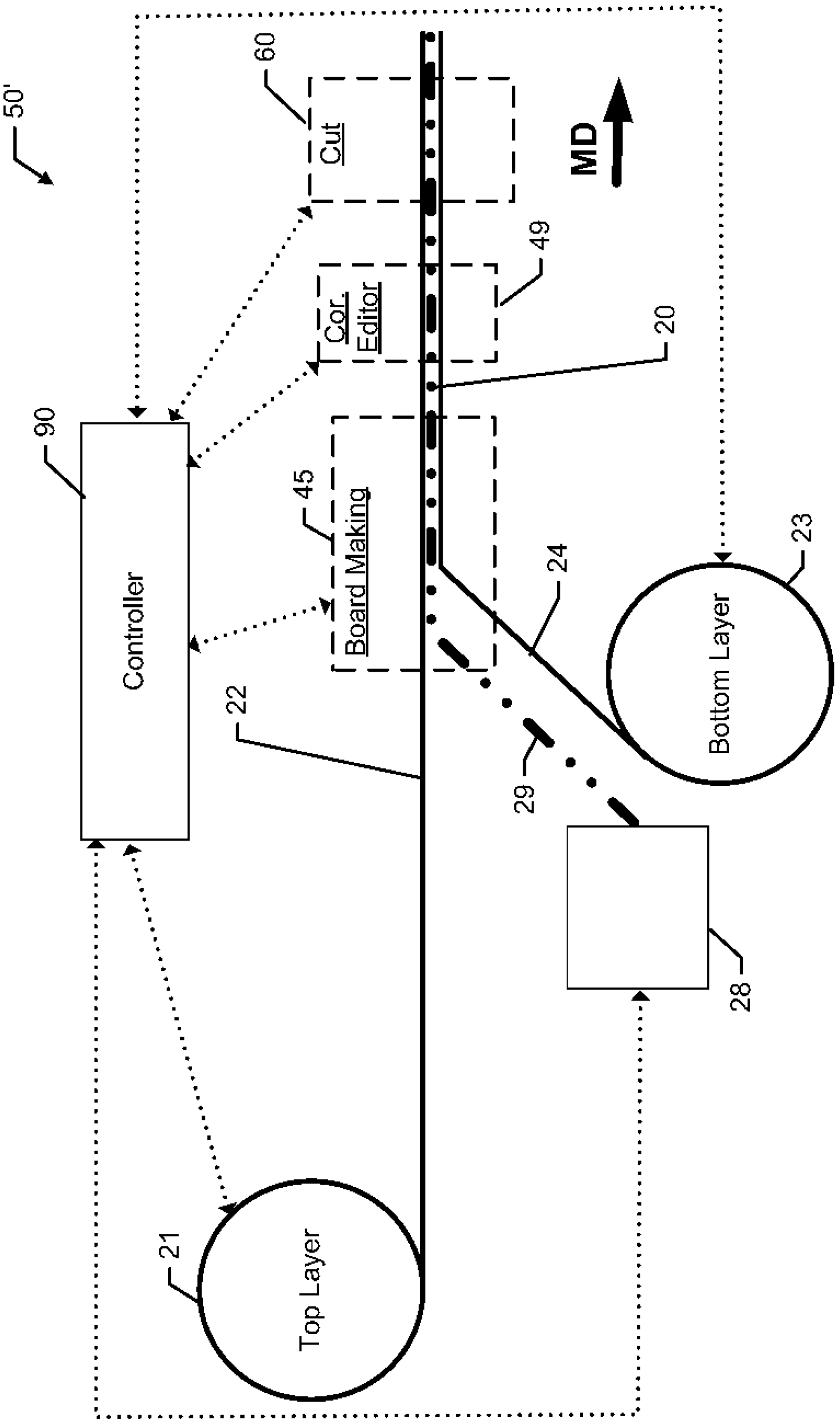
FIG. 2B illustrates a portion of the corrugated box manufacturing process with print off-line, before the corrugator, in accordance with some embodiments discussed herein.

In some embodiments, like the manufacturing process 10 described with respect to FIGS. 1A-1B, the example folded carton manufacturing process 710 may include one or more cutting devices 765 for cutting one or more sheets (or structures) from the roll of web product. Additionally, in some embodiments, a web forming device may form an updated web, such as prior to processing through the cutting device.

In some embodiments, the folded carton manufacturing process 710 may include one or more unique devices, such as a folding/gluing device 775 that may form part of the finishing phase 770 (or the sheet formation/processing phase 760). The folding/gluing device 775, such as using one or more folding arms or other hardware and/or various software, may be configured to perform one or more folds of various sheets to form the desired folded carton. In some embodiments, the folding device 775 may be configured to apply glue separately or in addition to performing the one or more folds.

Figure 14:
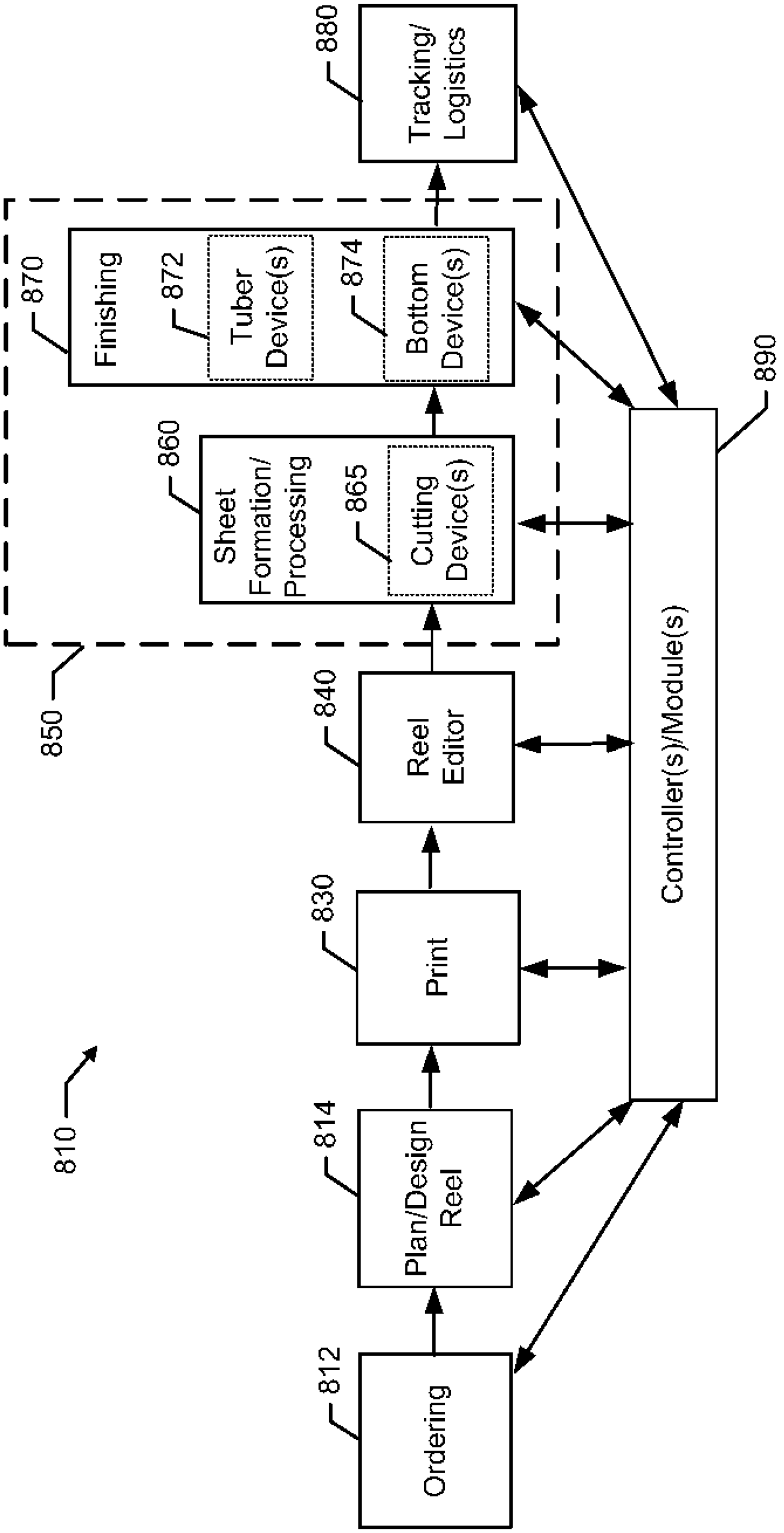
FIG. 14 shows a block diagram of an example industrial bag manufacturing process, in accordance with some embodiments discussed herein.

FIG. 14 shows a block diagram of an example industrial bag manufacturing process. The manufacturing process 810 includes a number of phases that result in a finished industrial bag that is shaped, formed, and printed per the customer's order. The process 810 may include an ordering phase 812, a planning phase 814, a print phase 830, a reel editor phase 840, a sheet formation/processing phase 860, a finishing phase 870, and a tracking/logistics phase 880. Such phases may be similar to the phases described with respect to the manufacturing phase 10 of FIGS. 1A-1B. In some embodiments, less or more phases or different orders of phases are contemplated. Depending on the desired configuration, one or more controller(s) 890 may be used to control one or more various phases (e.g., various systems/devices therein) of the manufacturing process 810. In some embodiments, one device/system may encompass multiple phases, such as two or more of the printing phase 830, the reel editor phase 840, the sheet formation/processing phase 860, and the finishing phase 870. For example, an industrial bag manufacturing machine 850 may encompass both the sheet formation/processing phase 860 and the finishing phase 870.

In some embodiments, like the manufacturing process 10 described with respect to FIGS. 1A-1B, the example industrial bag manufacturing process 810 may include one or more cutting devices 865 for cutting one or more sheets (or structures) from the roll of web product. Additionally, in some embodiments, a web forming device may form an updated web, such as prior to processing through the cutting device.

In some embodiments, the industrial bag manufacturing process 810 may include one or more unique devices, such as a tuber device 872 and/or bottom device 874 that may form part of the finishing phase 870 (or the sheet formation/processing phase 860). The tuber device 872, such as using various hardware and/or software, may be configured to form one or more sheets into one or more tubes. The bottom device 874, such as using various hardware and/or software, may be configured to form a bottom on each of the tubes to form the industrial bag.

Figure 15:
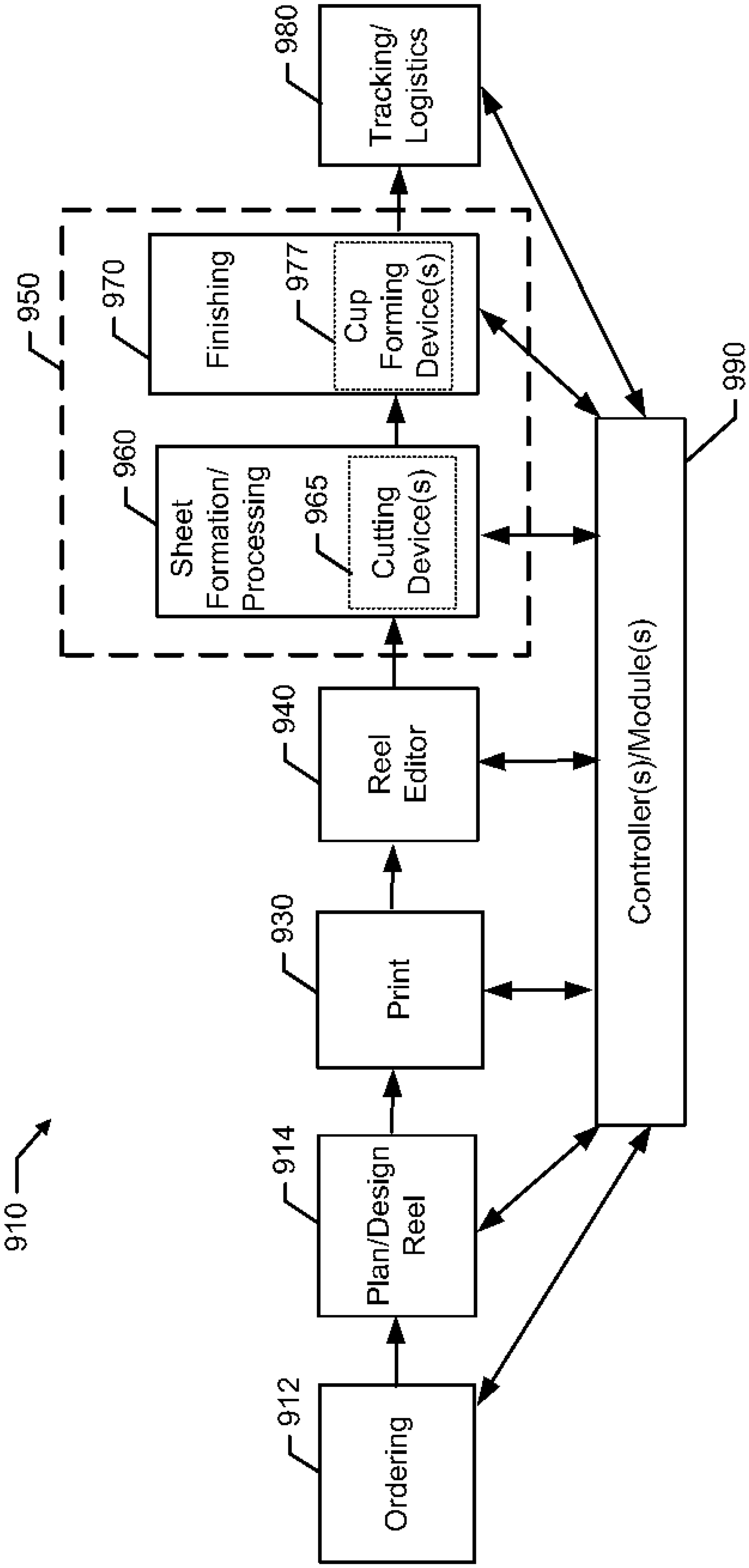
FIG. 15 shows a block diagram of an example cup manufacturing process, in accordance with some embodiments discussed herein.

FIG. 15 shows a block diagram of an example cup manufacturing process. The manufacturing process 910 includes a number of phases that result in a finished cup that is shaped, formed, and printed per the customer's order. The process 910 may include an ordering phase 912, a planning phase 914, a print phase 930, a reel editor phase 940, a sheet formation/processing phase 960, a finishing phase 970, and a tracking/logistics phase 980. Such phases may be similar to the phases described with respect to the manufacturing phase 10 of FIGS. 1A-1B. In some embodiments, less or more phases or different orders of phases are contemplated. Depending on the desired configuration, one or more controller(s) 990 may be used to control one or more various phases (e.g., various systems/devices therein) of the manufacturing process 910. In some embodiments, one device/system may encompass multiple phases, such as two or more of the printing phase 930, the reel editor phase 940, the sheet formation/processing phase 960, and the finishing phase 970. For example, a cup manufacturing machine 950 may encompass both the sheet formation/processing phase 960 and the finishing phase 970.

In some embodiments, like the manufacturing process 10 described with respect to FIGS. 1A-1B, the example cup manufacturing process 910 may include one or more cutting devices 965 for cutting one or more sheets (or structures) from the roll of web product. Additionally, in some embodiments, a web forming device may form an updated web, such as prior to processing through the cutting device.

In some embodiments, the cup manufacturing process 910 may include one or more unique devices, such as a cup former 977 that may form part of the finishing phase 970 (or the sheet formation/processing phase 960). The cup former 977, such as using various hardware and/or software, may be configured to form one or more sheets (or structures) into a cup with a desired shape (e.g., the cup former 977 may employ a die-cutter that cuts the sheet into a desired shape and a cup formation device that forms the cylindrical cup shape with a bottom and glues the cup together).

Figure 16:
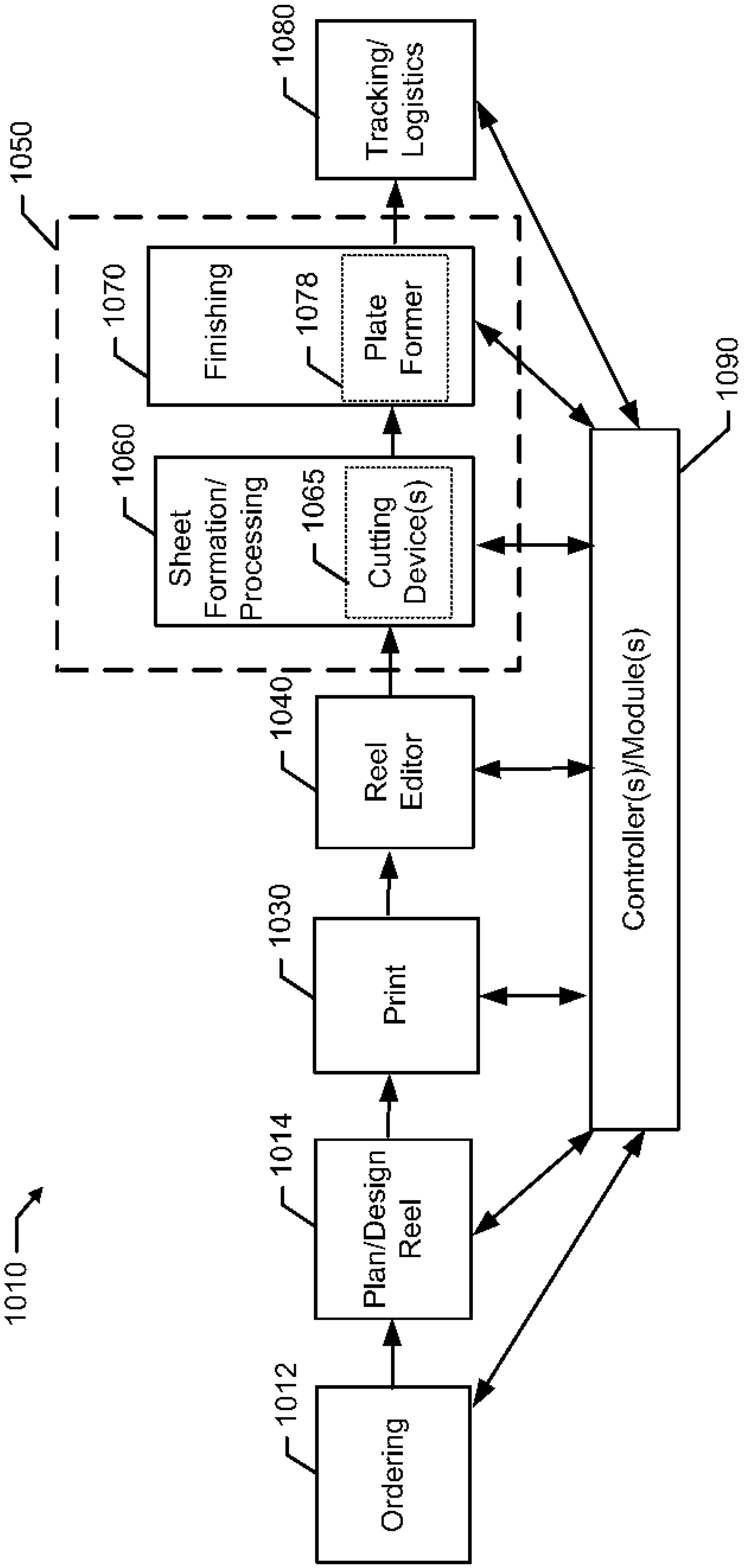
FIG. 16 shows a block diagram of an example paper plate manufacturing process, in accordance with some embodiments discussed herein.

FIG. 16 shows a block diagram of an example paper plate manufacturing process. The manufacturing process 1010 includes a number of phases that result in a finished paper plate that is shaped, formed, and printed per the customer's order. The process 1010 may include an ordering phase 1012, a planning phase 1014, a print phase 1030, a reel editor phase 1040, a sheet formation/processing phase 1060, a finishing phase 1070, and a tracking/logistics phase 1080. Such phases may be similar to the phases described with respect to the manufacturing phase 10 of FIGS. 1A-1B. In some embodiments, less or more phases or different orders of phases are contemplated. Depending on the desired configuration, one or more controller(s) 1090 may be used to control one or more various phases (e.g., various systems/devices therein) of the manufacturing process 1010. In some embodiments, one device/system may encompass multiple phases, such as two or more of the printing phase 1030, the reel editor phase 1040, the sheet formation/processing phase 1060, and the finishing phase 1070. For example, a plate manufacturing machine 1050 may encompass both the sheet formation/processing phase 1060 and the finishing phase 1070.

In some embodiments, like the manufacturing process 10 described with respect to FIGS. 1A-1B, the example paper plate manufacturing process 1010 may include one or more cutting devices 1065 for cutting one or more sheets (or structures) from the roll of web product. Additionally, in some embodiments, a web forming device may form an updated web, such as prior to processing through the cutting device.

In some embodiments, the paper plate manufacturing process 1010 may include one or more unique devices, such as a plate former 1078 that may form part of the finishing phase 1070 (or the sheet formation/processing phase 1060). The plate former 1078, such as using various hardware and/or software, may be configured to form one or more sheets (or structures) into a plate with a desired shape (e.g., the plate former 1078 may have a stamping device that stamps the sheet into a desired shape).

Although the above description notes one or more distinctions between the various manufacturing processes 710, 810, 910, 1010 and the manufacturing process 10, other distinctions are contemplated by some embodiments of the present invention. For example, the tracking/logistics phase for each manufacturing process may be different or employ different techniques that allow for efficient manufacturing of the end product. Whether the same or different, various tracking/marking/detecting techniques described herein may be employed with manufacturing of such example products to provide for an efficient manufacturing process.

Example Flowchart(s)

Embodiments of the present invention provide methods, apparatuses and computer program products for controlling and operating the corrugator for manufacturing sheet or box structures according to various embodiments described herein. Various examples of the operations performed in accordance with embodiments of the present invention will now be provided with reference to FIGS. 17-18.

Figure 17:
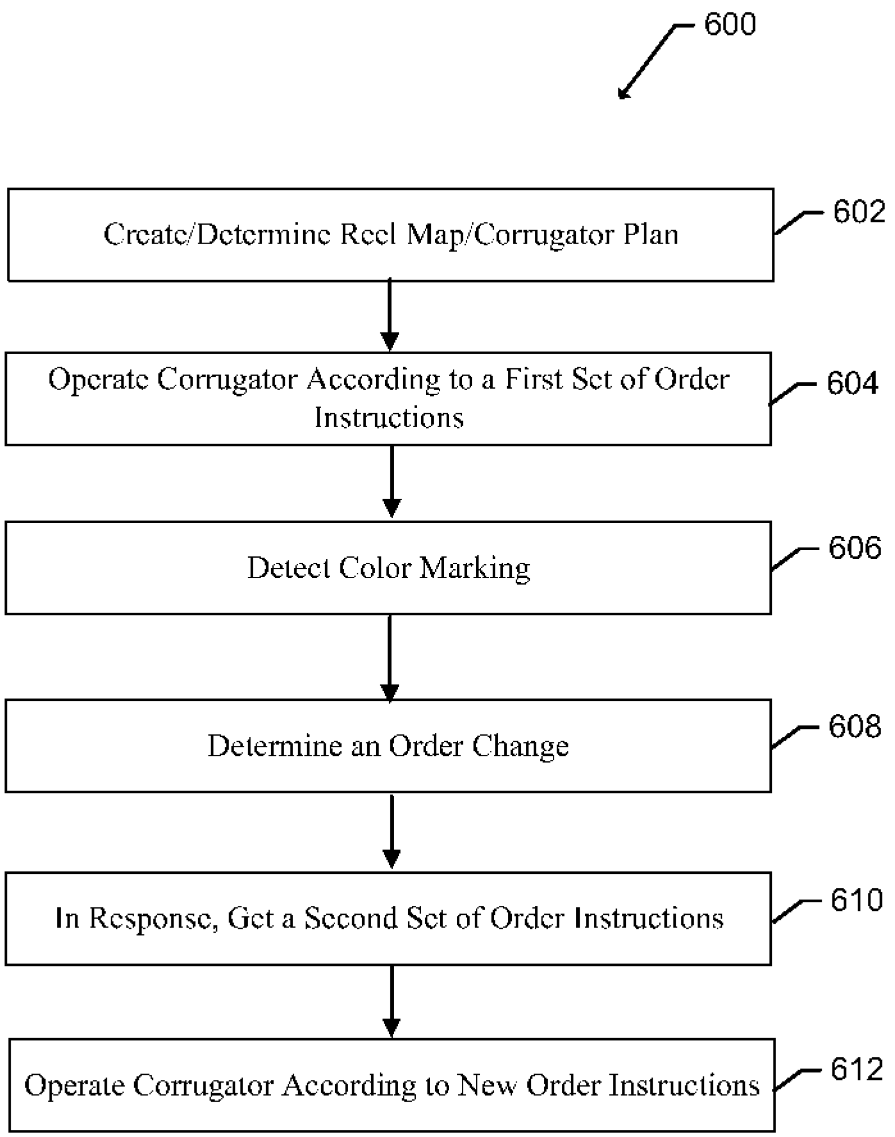
FIG. 17 illustrates an example flowchart for a method of operating a corrugator, in accordance with example embodiments described herein.

FIG. 17 illustrates a flowchart according to an example method for controlling a corrugator during manufacturing of boxes according to an example embodiment. The operations illustrated in and described with respect to FIG. 17 may, for example, be performed by, with the assistance of, and/or under the control of one or more of the controller 90, 790, 890, 990, 1090 components of the phases in the described manufacturing process 10, and/or modules present in the described platform 100.

The method 600 may include creating and/or determining a corrugator plan/reel map at operation 602. At operation 604, the method comprises operating the corrugator (and its various components) according to a first set of order instructions in the corrugator plan. Upon detecting a color marker (or other marking indicating an order change, such as a QR code, bar code, etc.) at operation 606, the method comprises, at operation 608, determining whether an order change occurred. Then, at operation 610, the method comprises obtaining a second set of order instructions from the corrugator plan in an instance in which an order change is determined to have occurred. At operation 612, the method comprises operating the corrugator according to the second set of order instructions.

Figure 18:
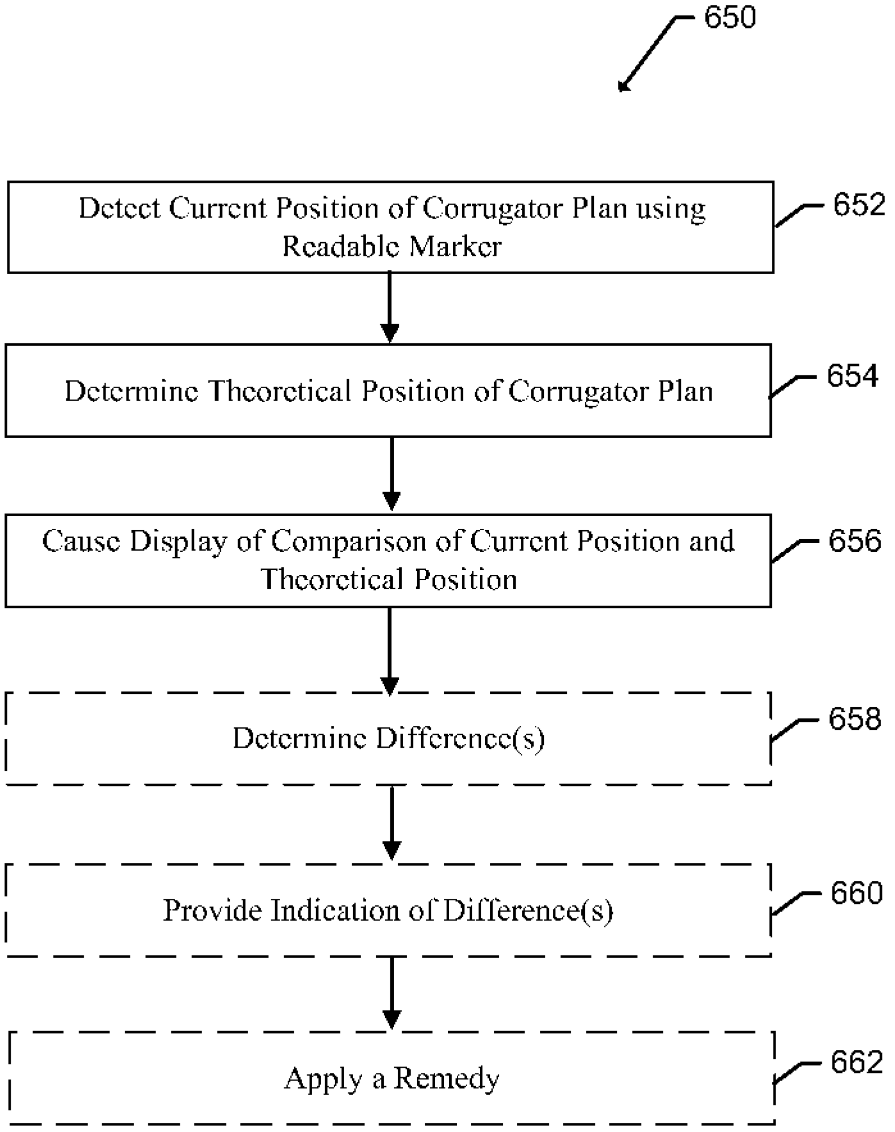
FIG. 18 illustrates an example flowchart for a method of operating a corrugator, in accordance with example embodiments described herein.

FIG. 18 illustrates a flowchart according to another example method for controlling a corrugator during manufacturing of boxes according to an example embodiment. The operations illustrated in and described with respect to FIG. 18 may, for example, be performed by, with the assistance of, and/or under the control of one or more of the controller 90, 790, 890, 990, 1090 components of the phases in the described manufacturing process 10, and/or modules present in the described platform 100.

The method 650 may include, at operation 652, detecting a current position of a corrugator plan/reel map by detecting one or more readable markers and referencing the position using the corrugator plan/reel map. At operation 654, the theoretical position of the corrugator plan/reel map is determined, where the theoretical position is the scheduled position that the corrugator is currently operating at. At operation 656, a representation of the current position and a representation of the theoretical position are displayed for comparison by an operator. In some embodiments, at operation 658, the controller may determine one or more differences between the current position and the theoretical position. At operation 660, in some embodiments, one or more indications of the differences may be provided to an operator, such as by highlighting the differences. At operation 662, in some embodiments, a remedy may be applied, such as through use of an emergency stop and/or through changing operational control of the corrugator.

FIGS. 17-18 illustrate flowcharts of a system, method, and computer program product according to various example embodiments described herein. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory and executed by, for example, the controller 90. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

Conclusion

Many modifications and other embodiments of the inventions set forth herein may conic to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A system for making corrugated box structures using a corrugator, the system comprising:

a corrugated board web comprising at least a first order section and a second order section, wherein the first order section includes at least one cut-to-mark marking that is used to signal an initiation of a cut of the corrugated board web to help form at least one first box structure, wherein the second order section includes at least one cut-to-mark marking that is used to signal an initiation of a cut of the corrugated board web to help form at least one second box structure, wherein the first order section is different than the second order section, wherein the corrugated board web further comprises an order change section positioned between the first order section and the second order section, wherein at least one of the first order section, the second order section, or the order change section includes at least one readable marking;

at least one readable mark detector that is configured to read data from one or more readable markings on the corrugated board web;

a display; and a controller to:

operate one or more components of the corrugator according to a set of current order instructions corresponding an order section of the corrugated board web, wherein the set of current order instructions are obtained from a corrugator plan;

determine, via the controller, a detected current position of the corrugated board web in the corrugator based on data read by the at least one readable mark detector from the one or more readable markings on the corrugated board web;

determine, via the controller, a theoretical current position of the corrugated board web based on at least the current set of order instructions from the corrugator plan that are being utilized in operation of the corrugator; and transmit instructions for the display to present both a representation of the detected current position of the corrugated board web and a representation of the theoretical current position of the corrugated board web to enable an operator to compare the detected current position of the corrugated board web and the theoretical current position of the corrugated board web.

2. The system of claim 1, wherein the controller is configured to:

receive user input directing the corrugator to perform an emergency stop; and cause, in response to receiving the user input, the corrugator to cease operation.

3. The system of claim 1, wherein the controller is configured to:

compare the detected current position of the corrugated board web and the theoretical current position of the corrugated board web; and provide an indication to a user in an instance in which the detected current position of the corrugated board web is different than the theoretical current position of the corrugated board web.

4. The system of claim 1, wherein the representation of the detected current position of the corrugated board web is presented in the form of a first set of order instructions for one or more components of the corrugator, and wherein the representation of the theoretical current position of the corrugated board web is presented in the form of a second set of order instructions for one or more components of the corrugator.

5. The system of claim 4, wherein the first set of order instructions is presented side-by-side to the second set of order instructions on the display.

6. The system of claim 1, wherein the representation of the detected current position of the corrugated board web is presented in the form of a first visualization of the corrugated board web with one or more box structure outlines, and wherein the representation of the theoretical current position of the corrugated board web is presented in the form of a second visualization of the corrugated board web with one or more box structure outlines.

7. The system of claim 6, wherein the first visualization is presented side-by-side to the second visualization on the display.

8. The system of claim 1, wherein the controller is configured to:

receive user input directing the corrugator to change operation of one or more components of the corrugator based on a selected set of order instructions; and cause, in response to receiving the user input, the corrugator to operate according to the selected set of order instructions.

9. A method for making corrugated box structures using a corrugator, the method comprising:

providing a corrugated board web comprising at least a first order section and a second order section, wherein the first order section includes at least one cut-to-mark marking that is used to signal an initiation of a cut of the corrugated board web to help form at least one first box structure, wherein the second order section includes at least one cut-to-mark marking that is used to signal an initiation of a cut of the corrugated board web to help form at least one second box structure, wherein the first order section is different than the second order section, wherein the corrugated board web further comprises an order change section positioned between the first order section and the second order section, wherein at least one of the first order section, the second order section, or the order change section includes at least one readable marking;

providing at least one readable mark detector that is configured to read data from one or more readable markings on the corrugated board web;

providing a display; and operating one or more components of the corrugator according to a set of current order instructions corresponding an order section of the corrugated board web, wherein the set of current order instructions are obtained from a corrugator plan;

determining, via a controller, a detected current position of the corrugated board web in the corrugator based on data read by the at least one readable mark detector from the one or more readable markings on the corrugated board web;

determining, via the controller, a theoretical current position of the corrugated board web based on at least the current set of order instructions from the corrugator plan that are being utilized in operation of the corrugator; and transmitting instructions for the display to present both a representation of the detected current position of the corrugated board web and a representation of the theoretical current position of the corrugated board web to enable an operator to compare the detected current position of the corrugated board web and the theoretical current position of the corrugated board web.

10. The method of claim 9 comprising:

receiving user input directing the corrugator to perform an emergency stop; and causing, in response to receiving the user input, the corrugator to cease operation.

11. The method of claim 9 comprising:

comparing the detected current position of the corrugated board web and the theoretical current position of the corrugated board web; and providing an indication to a user in an instance in which the detected current position of the corrugated board web is different than the theoretical current position of the corrugated board web.

12. The method of claim 9, wherein the representation of the detected current position of the corrugated board web is presented in the form of a first set of order instructions for one or more components of the corrugator, and wherein the representation of the theoretical current position of the corrugated board web is presented in the form of a second set of order instructions for one or more components of the corrugator.

13. The method of claim 12, wherein the first set of order instructions is presented side-by-side to the second set of order instructions on the display.

14. The method of claim 9, wherein the representation of the detected current position of the corrugated board web is presented in the form of a first visualization of the corrugated board web with one or more box structure outlines, and wherein the representation of the theoretical current position of the corrugated board web is presented in the form of a second visualization of the corrugated board web with one or more box structure outlines.

15. The method of claim 14, wherein the first visualization is presented side-by-side to the second visualization on the display.

16. The method of claim 9 comprising:

receiving user input directing the corrugator to change operation of one or more components of the corrugator based on a selected set of order instructions; and causing, in response to receiving the user input, the corrugator to operate according to the selected set of order instructions.

* * * * *